US011705942B2

(12) United States Patent
Jassal et al.

(10) Patent No.: US 11,705,942 B2
(45) Date of Patent: *Jul. 18, 2023

(54) METHODS FOR UE-SPECIFIC RS MULTIPLEXING

(71) Applicant: Huawei Technologies Co., Ltd., Shenzhen (CN)

(72) Inventors: Aman Jassal, Kanata (CA); Keyvan Zarifi, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 205 days.

This patent is subject to a terminal disclaimer.

(21) Appl. No.: 17/074,023

(22) Filed: Oct. 19, 2020

(65) Prior Publication Data

US 2021/0036903 A1 Feb. 4, 2021

Related U.S. Application Data

(63) Continuation of application No. 16/101,319, filed on Aug. 10, 2018, now Pat. No. 10,833,905.

(51) Int. Cl.
*H04L 5/00* (2006.01)
*H04B 7/06* (2006.01)
(Continued)

(52) U.S. Cl.
CPC ......... *H04B 7/0404* (2013.01); *H04B 7/0408* (2013.01); *H04B 7/0626* (2013.01);
(Continued)

(58) Field of Classification Search
CPC ........... H04L 27/2611; H04L 27/26025; H04L 27/261; H04L 5/0012; H04L 5/0048;
(Continued)

(56) References Cited

U.S. PATENT DOCUMENTS

2017/0367073 A1* 12/2017 Murugan .............. H04L 5/0051
2018/0019857 A1 1/2018 Kazmi et al.
(Continued)

FOREIGN PATENT DOCUMENTS

CN 105406951 A 3/2016
CN 107734566 A 2/2018
(Continued)

OTHER PUBLICATIONS

RAN1, "LS reply on beam failure recovery", 3GPP TSG RAN WG2#101, R2-1803981, Feb. 26-Mar. 2, 2018, 5 Pages, Athens, Greece.
(Continued)

*Primary Examiner* — Edan Orgad
*Assistant Examiner* — Vanneilian Lalchinthang
(74) *Attorney, Agent, or Firm* — Slater Matsil, LLP

(57) ABSTRACT

A method for reference signal processing is provided. In this example, the method includes receiving, by a UE, a message from a network device, where the message indicates both that a first reference signal is to be transmitted over a first resource and that a second reference signal is to be transmitted over a second resource. The method also includes receiving, by the UE, at least the first reference signal in accordance with capabilities of the UE and the message received from the network device.

20 Claims, 13 Drawing Sheets

(51) Int. Cl.

| | |
|---|---|
| *H04W 76/19* | (2018.01) |
| *H04B 7/0404* | (2017.01) |
| *H04B 7/0408* | (2017.01) |
| *H04B 17/10* | (2015.01) |
| *H04W 8/24* | (2009.01) |
| *H04L 27/26* | (2006.01) |

(52) U.S. Cl.
CPC ......... *H04B 17/104* (2015.01); *H04L 5/0012* (2013.01); *H04L 5/0048* (2013.01); *H04L 27/261* (2013.01); *H04L 27/26025* (2021.01); *H04W 8/24* (2013.01)

(58) Field of Classification Search
CPC ... H04L 5/0007; H04L 5/0023; H04L 5/0091; H04B 7/0404; H04B 17/104; H04B 7/0408; H04B 7/0626; H04B 7/0695; H04B 7/068; H04W 8/24
USPC ........................................................ 370/208
See application file for complete search history.

(56) References Cited

U.S. PATENT DOCUMENTS

| | | | |
|---|---|---|---|
| 2018/0102817 A1 | 4/2018 | Park et al. | |
| 2018/0102821 A1* | 4/2018 | Manolakos | H04L 5/0023 |
| 2018/0324678 A1 | 11/2018 | Chen et al. | |
| 2018/0337756 A1 | 11/2018 | Nam et al. | |
| 2018/0351611 A1 | 12/2018 | Nagaraja et al. | |
| 2019/0007906 A1* | 1/2019 | Hessler | H04W 52/0245 |
| 2019/0028174 A1 | 1/2019 | Chakraborty et al. | |
| 2019/0052342 A1* | 2/2019 | Määttanen | H04B 7/088 |
| 2019/0089447 A1* | 3/2019 | Sang | H04W 76/19 |
| 2019/0123870 A1* | 4/2019 | Frenne | H04L 5/0023 |
| 2019/0132759 A1 | 5/2019 | Park et al. | |
| 2019/0166612 A1* | 5/2019 | Yokomakura | H04L 5/0005 |
| 2019/0173644 A1 | 6/2019 | Lyu et al. | |
| 2019/0174554 A1* | 6/2019 | Deenoo | H04W 72/0453 |
| 2021/0314049 A1* | 10/2021 | Matsumura | H04W 24/10 |

FOREIGN PATENT DOCUMENTS

| | | |
|---|---|---|
| CN | 108347270 A | 7/2018 |
| EP | 3579607 A1 | 12/2019 |
| EP | 3836668 A1 | 6/2021 |
| WO | 2011120447 A1 | 10/2011 |
| WO | 2014116090 A1 | 7/2014 |
| WO | 2017209505 A1 | 12/2017 |
| WO | 2018065662 A1 | 4/2018 |
| WO | 2018143776 A1 | 8/2018 |

OTHER PUBLICATIONS

Intel. Corporation, "Summary of simultaneous transmission and reception of channels/signals", 3GPP TSG RAN WG1 Meeting #92bis, R1-1805575, Apr. 16-20, 2018 10 Pages, Sanya, China.

3rd Generation Partnership Project; Technical Specification Group Radio Access Network; NR; Requirements for support of radio resource management (Release 15), 3GPP TS 38.133, Jun. 2018, 79 Pages, V15.2.0.

Ericsson, "On simultaneous reception of physical and reference signals across CCs", 3GPP TSG RAN WG1 Meeting #92bis, R1-1804977, Apr. 16-20, 2018, 12 Pages, Sanya, China.

Intel Corporation, "Summary of Multiplexing of Physical Channels and RS", 3GPP TSG RAN WG1 Meeting #93, R1-1807708, May 21-25, 2018, 18 Pages, Busan, Korea.

* cited by examiner

METHODS FOR UE-SPECIFIC RS MULTIPLEXING

CROSS-REFERENCE TO RELATED APPLICATIONS

The present application is a continuation of U.S. patent application Ser. No. 16/101,319, filed on Aug. 10, 2018, entitled "Methods for UE-Specific RS Multiplexing," which is hereby incorporated by reference herein as if reproduced in its entirety.

TECHNICAL FIELD

The present disclosure relates to a system and method for wireless communications, and, in particular, to a system and method for processing multiplexed reference signals.

BACKGROUND

Modern wireless communication systems use reference signals (RSs) for various different purposes, such as channel estimation, demodulation, and measurement for mobility related procedures. In general, a reference signal is a sequence of known symbols that is transmitted over a communication channel to allow a receiver to estimate radio properties of the communication channel by, for example, comparing the received symbol values with the known symbol values. In networks that support coordinated transmission/reception, reference signals may be communicated to a receiver over multiple communication channels simultaneously. This may be problematic for receivers that are incapable of receiving multiple reference signal transmissions at the same time, such as legacy receivers that only include a single receive chain or a single receive (RX) beamformer.

SUMMARY

Technical advantages are generally achieved by embodiments of this disclosure which instruct a user equipment (UE) to prioritize one reference signal over another when multiple reference signals are communicated to the UE at the same time.

According to one aspect of the present disclosure, a method for reference signal processing is provided, wherein the method includes receiving, by a UE, a message from a network device, where the message indicates both that a first reference signal is to be transmitted over a first resource and that a second reference signal is to be transmitted over a second resource. The method also includes receiving, by the UE, at least the first reference signal in accordance with capabilities of the UE and the message received from the network device.

Optionally, in some embodiments of any of the preceding aspects, the first reference signal and the second reference signal are transmitted using different Orthogonal Frequency Division Multiplexing (OFDM) numerologies.

Optionally, in some embodiments of any of the preceding aspects, the first reference signal is transmitted in accordance with a first beam direction, and the second reference signal is transmitted in accordance with a second beam direction.

Optionally, in some embodiments of any of the preceding aspects, receiving at least the first reference signal comprises receiving both the first reference signal and the second reference signal when the UE supports simultaneous reception of both the first reference signal and the second reference signal.

Optionally, in some embodiments of any of the preceding aspects, receiving at least the first reference signal comprises receiving the first reference signal without receiving the second reference signal when the UE does not support simultaneous reception of both the first reference signal and the second reference signal.

Optionally, in some embodiments of any of the preceding aspects, the first reference signal is a Radio Link Monitoring (RLM) reference signal measured by the UE for an RLM process, and the RLM reference signal is received by the UE when a T310 timer of the UE has been triggered and is still running.

Optionally, in some embodiments of any of the preceding aspects, the first reference signal is a Beam Failure Detection (BFD) reference signal measured by the UE for a BFD process, and the BFD reference signal is received by the UE when a BFD timer of the UE has been triggered and is still running.

Optionally, in some embodiments of any of the preceding aspects, the first reference signal is a Beam Failure Recovery (BFR) reference signal measured by the UE for a BFR process, and the BFR reference signal is received by the UE when a BFR timer of the UE has been triggered and is still running.

Optionally, in some embodiments of any of the preceding aspects, the first reference signal is a Radio Resource Management (RRM) reference signal measured by the UE for an RRM process, and the RRM reference signal is received by the UE when the RRM reference signal is an SSB transmitted within an SSB based RRM measurement timing configuration (SMTC) window.

According to another aspect of the present disclosure, a method for reference signal processing is provided, wherein the method includes receiving, by a network device, a message from a UE, where the message indicates capabilities of the UE. The method also includes scheduling, by the network device, a first reference signal and a second reference signal in accordance with the capabilities of the UE, where the first reference signal is configured to be transmitted to the UE over a first resource.

Optionally, in some embodiments of any of the preceding aspects, the second reference signal is prevented from being transmitted to the UE over a second resource when the UE does not support simultaneous reception of both the first reference signal over the first resource and the second reference signal over the second resource.

Optionally, in some embodiments of any of the preceding aspects, the second reference signal is configured to be transmitted to the UE over a second resource when the UE supports simultaneous reception of both the first reference signal over the first resource and the second reference signal over the second resource.

According to another aspect of the present disclosure, a UE is provided, wherein the UE comprises a non-transitory memory storage comprising instructions, and one or more processors in communication with the non-transitory memory storage, where the one or more processors execute the instructions to receive a message from a network device, the message indicating both that a first reference signal is to be transmitted over a first resource and that a second reference signal is to be transmitted over a second resource, and receive at least the first reference signal in accordance with capabilities of the UE and the message received from the network device.

Optionally, in some embodiments of any of the preceding aspects, the first resource and the second resource are located within a threshold distance in the time domain.

Optionally, in some embodiments of any of the preceding aspects, receiving at least the first reference signal comprises receiving the first reference signal without receiving the second reference signal when the UE does not support simultaneous reception of both the first reference signal and the second reference signal.

Optionally, in some embodiments of any of the preceding aspects, the first reference signal is an RLM reference signal measured by the UE for an RLM process, and a higher layer of the UE has received n consecutive Out-of-Sync indications from a lower layer of the UE, n being less than n310.

Optionally, in some embodiments of any of the preceding aspects, the first reference signal is a BFD reference signal measured by the UE for a BFD process, and the BFD reference signal is received by the UE when a higher layer of the UE has received at least n beam failure indications from a lower layer of the UE, n being less than a threshold value.

Optionally, in some embodiments of any of the preceding aspects, the first reference signal is a BFR reference signal measured by the UE for a BFR process, and the BFR reference signal is received by the UE when a higher layer of the UE has received at least n beam failure indications from a lower layer of the UE, n being less than a threshold value.

Optionally, in some embodiments of any of the preceding aspects, the first reference signal is an RRM reference signal measured by the UE for an RRM process, and the RRM reference signal is received by the UE when the RRM reference signal is a CSI reference signal transmitted whether within or outside a SMTC window.

According to another aspect of the present disclosure, a network device is provided, wherein the network device comprises a non-transitory memory storage comprising instructions and one or more processors in communication with the non-transitory memory storage, where the one or more processors execute the instructions to receive a message from a UE, the message indicating capabilities of the UE, and schedule a first reference signal and a second reference signal in accordance with the capabilities of the UE, the first reference signal configured to be transmitted to the UE over a first resource.

Optionally, in some embodiments of any of the preceding aspects, the second reference signal is prevented from being transmitted to the UE over a second resource when the UE does not support simultaneous reception of both the first reference signal over the first resource and the second reference signal over the second resource.

Optionally, in some embodiments of any of the preceding aspects, the second reference signal is configured to be transmitted to the UE over a second resource when the UE supports simultaneous reception of both the first reference signal over the first resource and the second reference signal over the second resource.

The foregoing has outlined rather broadly the features of an embodiment of the present disclosure in order that the detailed description of the disclosure that follows may be better understood. Additional features and advantages of embodiments of the disclosure will be described hereinafter, which form the subject of the claims of the disclosure. It should be appreciated by those skilled in the art that the conception and specific embodiments disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Modern wireless communication systems use reference signals (RSs) for various different purposes, such as channel estimation, demodulation, and measurement for mobility related procedures. In general, a reference signal is a sequence of known symbols that is transmitted over a communication channel to allow a receiver to estimate radio properties of the communication channel by, for example, comparing the received symbol values with the known symbol values. In networks that support coordinated transmission/reception, reference signals may be communicated to a receiver over multiple communication channels simultaneously. This may problematic for receivers that are incapable of receiving multiple reference signal transmissions at the same time, such as legacy receivers that only include a single receive chain or a single receive (RX) beamformer.

Aspects of this disclosure provide embodiment techniques that instruct a user equipment (UE) to prioritize one reference signal over another when multiple reference signals are communicated to the UE at the same time. In one embodiment, the UE may receive a configuration message which indicates that different reference signals are to be transmitted to the UE. When the capabilities of the UE do not support simultaneous reception of these reference signals, the UE may choose to receive one reference signal without receiving the others. The UE may determine when to prioritize reception of the reference signal based on the configuration message the UE receives and previous measurements the UE has performed. Aspects of this disclosure also provide embodiment techniques that allow a network device to schedule transmissions of multiplexed reference signals in accordance with capabilities of the UE. In one example, a network device may receive the capabilities of the UE, and based thereon the network device may schedule transmissions of multiplexed reference signals to the UE. The network may configure a transmission of one reference signal to the UE, and may prevent another reference signal from being transmitted to the UE when the capabilities of the UE do not support simultaneous reception of both reference signals. These and other inventive aspects are discussed in greater detail below.

Figure 1:
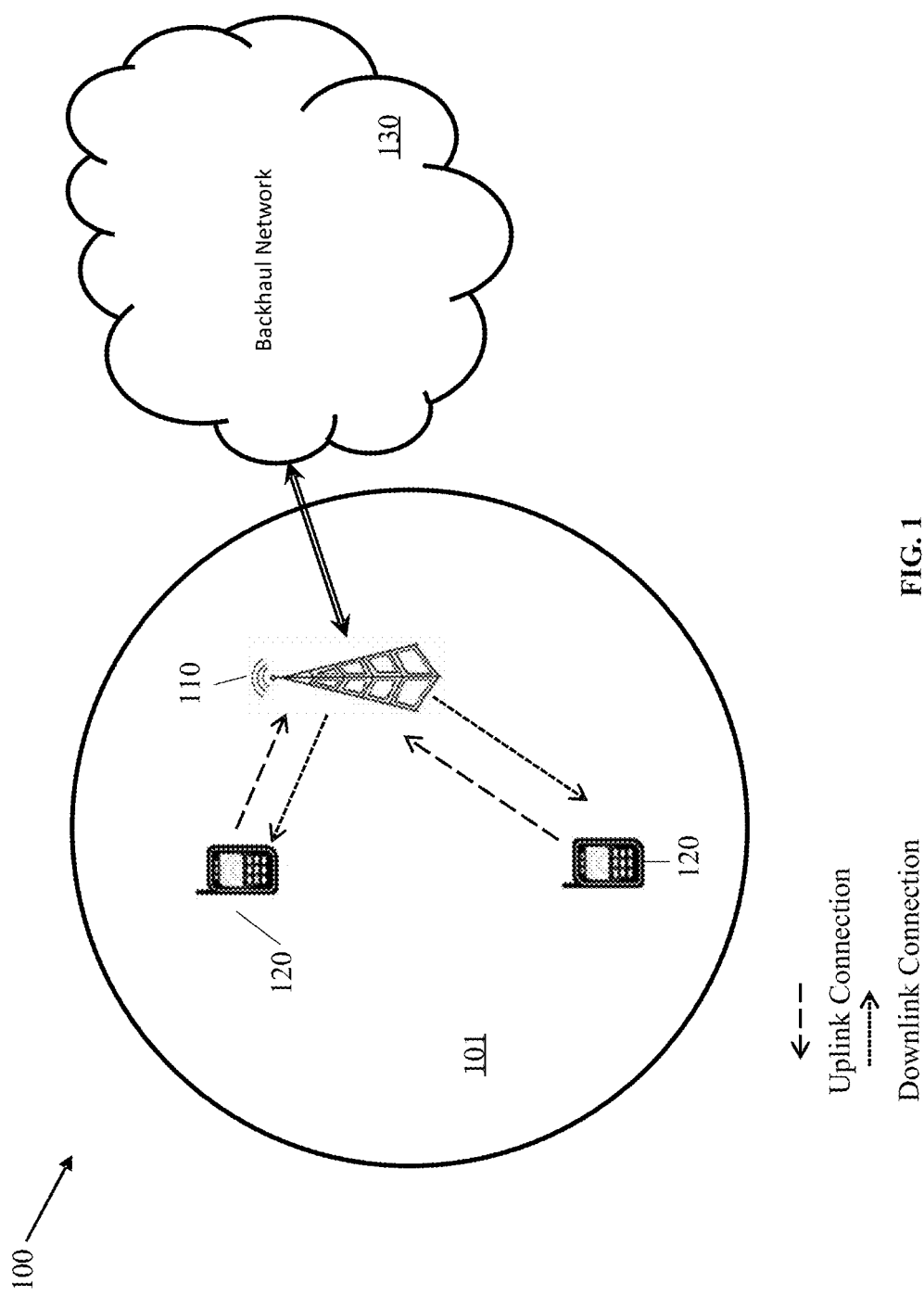
FIG. 1 illustrates an embodiment network architecture.

FIG. 1 is a network 100 for communicating data including reference signals. The network 100 comprises a base station 110 having a coverage area 101, a plurality of UEs 120, and a backhaul network 130. As shown, the base station 110 establishes uplink (dashed line) and/or downlink (dotted line) connections with the user equipments (UEs) 120, which serve to carry data from the UEs 120 to the base station 110 and vice-versa. Signals carried over the uplink/downlink connections may include traffic data and reference signals communicated between the UEs 120, as well as data communicated to/from a remote-end (not shown) by way of the backhaul network 130. As used herein, the term "base station" refers to any component (or collection of components) configured to provide wireless access to a network, such as a transmit receive point (TRP), an enhanced Node B (eNB), a next (fifth) generation (5G) NodeB (gNB), a macro-cell, a femtocell, a Wi-Fi access point (AP), or other wirelessly enabled devices. The base station 110 may provide wireless access in accordance with one or more wireless communication protocols, e.g., 5th generation new radio (5G_NR), long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Figure 2:
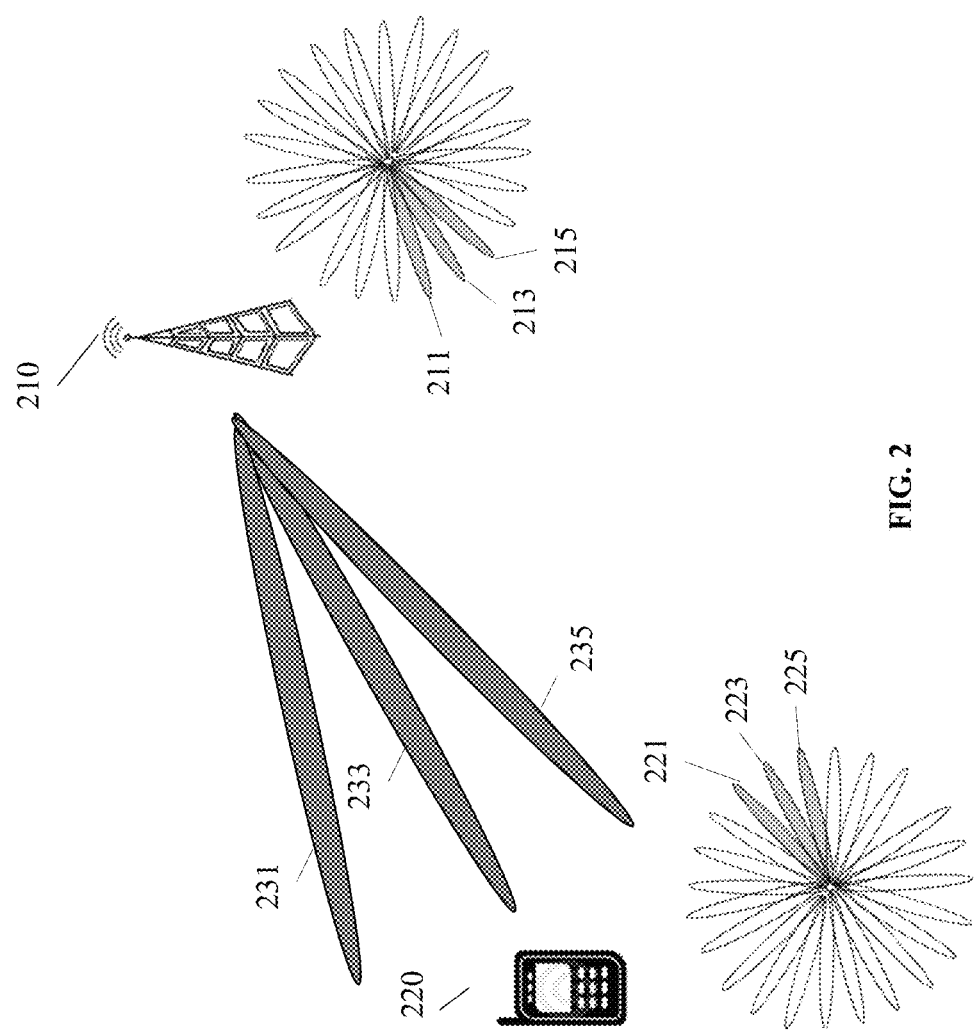
FIG. 2 illustrates an embodiment diagram of transmitting reference signals using beamforming.

FIG. 2 is a diagram of transmitting reference signals using a beamforming technique. Beamforming may be used to improve both transmission (TX) and reception (RX) performance. As shown, a base station 210 transmits reference signals 231, 233, 235 using TX beams 211, 213, 215 (respectively), and a UE 220 receives the reference signals 231, 233, 235 using RX beams 221, 223, 225. As used herein, the term "beam direction" refers to a radio antenna pattern, or set of beamforming weights, that is used for directional signal transmission and/or reception. The terms "beam directions" and "beams" are used interchangeably herein. Although UE 220 receives reference signals from only one base station in the example depicted by FIG. 2, it should be appreciated that UE 220 may receive references signals that are transmitted by another base station (not shown in FIG. 2) using some another set of TX beams.

Reference signals may be communicated for a variety of different purposes, such as Radio Link Monitoring (RLM), Beam Failure Detection (BFD), Beam Failure Recovery (BFR), and Radio Resource Management (RRM), etc. A reference signal measured by a UE for an RLM process may be referred to as an RLM reference signal. A reference signal measured by a UE for a BFD process may be referred to as a BFD reference signal. A reference signal measured by a UE for a BFR process may be referred to as a BFR reference signal. A reference signal measured by a UE for an RRM process may be referred to as an RRM reference signal. The terms RRM reference signal and Layer 3 (L3) mobility reference signal are used interchangeably throughout this disclosure. A reference signal can be a Channel State Information (CSI) reference signal, a Synchronization Signal Block (SSB) reference signal, a demodulation reference signal (DMRS) or a signal of some other types. Throughout this disclosure, primary and secondary synchronization signals transmitted as an SSB and a physical broadcast channel (PBCCH) are referred to collectively as "SSB reference signals" with the understanding that an "SSB reference signal" can include a primary synchronization signal, a secondary synchronization signal, or a combination thereof.

Reference signals may be transmitted using Orthogonal Frequency Division Multiplexing (OFDM) techniques, and different reference signals may have different OFDM numerologies. The term "numerology" refers to waveform parameterization of an OFDM signal transmission. Parameters that define the numerology may include, but are not limited to, subcarrier frequency, carrier bandwidth, length of the cyclic prefix, modulation and coding scheme, samples per OFDM symbol and length of OFDM symbol.

A measurement gap may be configured for a reference signal, if the reference signal is used for inter-frequency measurement that allows a UE to handover to a target cell on another frequency band. The UE with one radio frequency (RF) transceiver may not maintain a wireless communication link on one frequency band while performing measurements on another frequency band. To solve this problem, a technique named "measurement gap" creates a gap period in the time domain, during which only transmission and reception on some specific frequency band are allowed. When a UE receives a reference signal with a measurement gap, during the measurement gap the UE may stop transmission and reception on a current frequency, switch its RF transceiver to a frequency of the reference signal, perform measurements on the reference signal, and then switch back to the current frequency.

Figure 3:
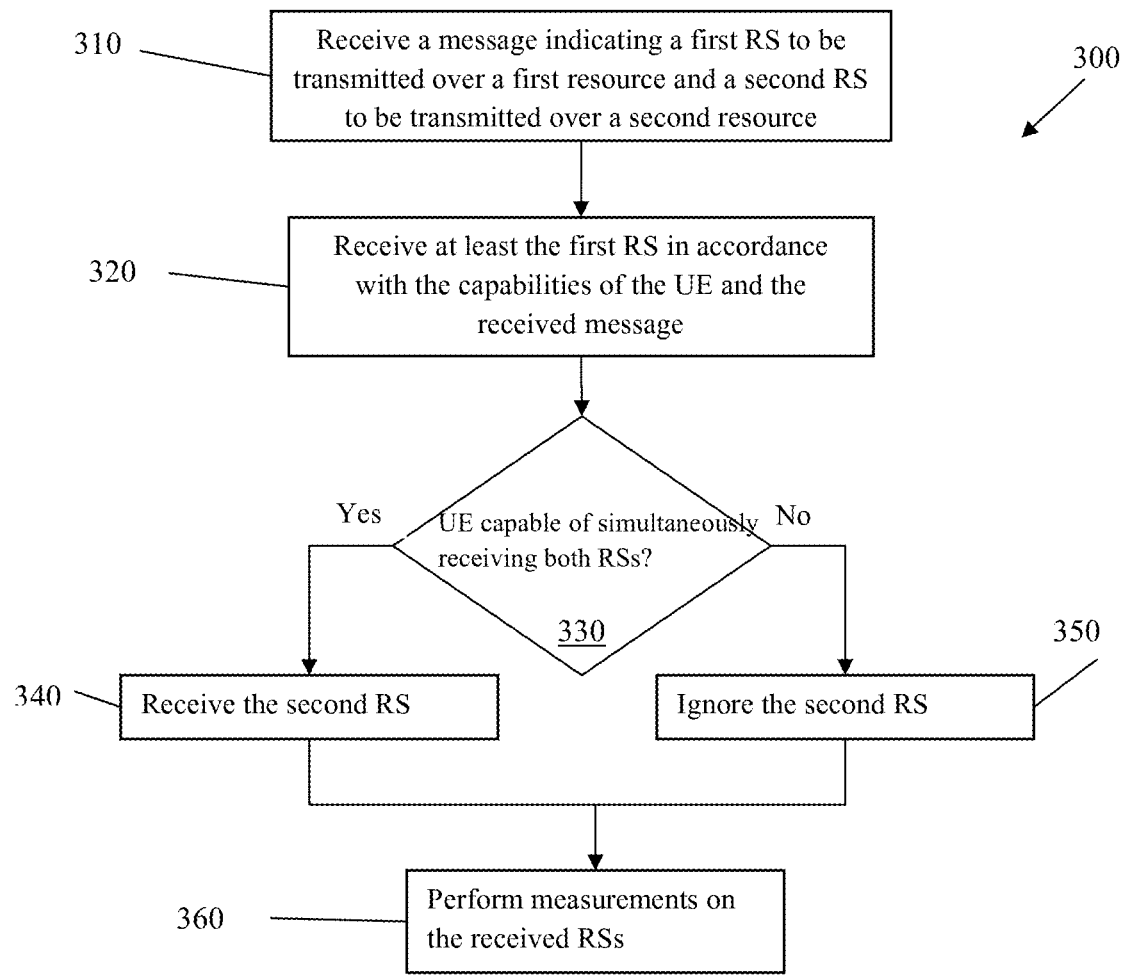
FIG. 3 illustrates an embodiment reference signal processing method performed by a UE.

FIG. 3 illustrates an example of a reference signal processing method 300 performed by a UE. At step 310, the UE receives a message from a network device indicating that a first reference signal is to be transmitted over a first resource and that a second reference signal is to be transmitted over a second resource. The message may be a higher layer signaling message, such as an RRC message or a MAC control element. In one example, the message indicates that the first reference signal is to be transmitted over a first time-frequency resource and that the second reference signal is to be transmitted over a second time-frequency resource. The message further indicates locations of the first resource and the second resource, as well as periods of these reference signals if they re-occur at regular intervals. In another example, the message indicates that the first reference signal is to be transmitted over a first beam and that the second reference signal is to be transmitted over a second beam.

Depending on configurations of these reference signals, the UE may not support simultaneous reception of both reference signals due to a limitation of the UE's capabilities. For example, if the reference signals are received over overlapping resources, the UE may not be able to separate them from each other using multiplexing techniques. In another example, the reference signals may be transmitted using two separate TX beams and the UE may only have one beamformer. If the reference signals arrive at the UE at the same time or within a short period, the UE may not have enough time to tune its RX beam to receive both reference signals. In some other cases, the UE may not receive the second reference signal at a different frequency if the second reference signal is transmitted during a measurement gap of the first reference signal. Or, the UE that supports only one numerology may not receive multiple reference signals that are transmitted with different numerologies.

At step 320, the UE receives at least the first reference signal in accordance with the capabilities of the UE and the message received from the network device. At step 330, the UE determines whether the capabilities of the UE support simultaneous reception of both the first reference signal and the second reference signal. If simultaneous reception of both reference signals is not supported, the method 300 proceeds to step 350, where the UE chooses to ignore or not receive the second reference signal. Otherwise, the method 300 proceeds to step 340, where the UE may optionally receive the second reference signal.

The method 300 then proceeds to step 360, where the UE measures a channel quality parameter based on the received reference signal. The channel quality parameter may be used to adjust a transmission or reception parameter of the UE, and/or communicated as feedback to one or more network devices.

In other words, after receiving the message configuring the first reference signal and the second reference signal that may both arrive at the UE, the UE may prioritize reception of the first reference signals in accordance with the capabilities of the UE.

In some embodiments, the prioritization may take different forms. In one embodiment, the UE may receive the first reference signal without receiving the second reference signal. In another embodiment, UE only receives the first reference signal and optionally receives the second reference signal. The optionally receiving the second reference signal may be based on UE implementation or based on higher layer signaling. In another embodiment, UE may receive both reference signals but only performs the task that is intended for the first reference signal. In another embodiment, UE may receive both reference signals but only performs the task that is intended for the first reference signal and optionally performs the task that is intended for the second reference signal. The optionally performing the task that is intended for the second reference signal may be based on UE implementation or based on higher layer signaling. In another embodiment, The UE may receive the first reference signal prior to receiving the second reference signal. In another embodiment, UE receives the first reference signal and performs the intended task on the first reference signal but it does not receive the second receive signal. In another embodiment, UE receives both reference signals but it does not perform the intended task on the second reference signal. In another embodiment, UE receives both reference signals but discards the second reference signal. In any of the above embodiments, the task that is intended for a reference signal may be RRM (mobility) measurement, RLM, BFD, or BFR.

In some embodiments, when a UE receives a first reference signal and a second reference signal and the UE is using the first reference signal due to performing signal processing tasks on that first reference signal, the UE may choose to discard the second reference signal under user-specific circumstances explained in the previous embodiments. Discarding a signal may consist in taking one of (but not limited to) the following actions: receiving the signal over the physical medium (e.g. the radio environment) and treating it as noise; receiving the signal over the physical medium and treating the received signal as interference; receiving the signal over the physical medium and not performing any kind of signal processing on that signal due to signal strength being below a given threshold. In all the above cases, the UE does not use any of its signal processing resources towards decoding a signal that it is looking to discard.

In some embodiments, the UE's behaviors also depend on UE specific radio conditions and/or previous measurements the UE has performed. Specifically, the UE may receive the reference signals based on rules listed as below.

In one embodiment, the first reference signal may be a Radio Link Monitoring (RLM) reference signal. The second reference signal may be but not limited to a BFD reference signal, a BFR reference signal, or an RRM reference signal.

RLM may serve a purpose of submitting Out-of-Sync (OOS) and In-Sync (IS) indications to higher layers of the UE. If radio link qualities of a consecutive number of RLM reference signals are below a threshold value $Q_{out}$, then a lower layer (e.g., physical layer) of the UE may send an OOS indication to a higher layer (e.g., Media Access Control (MAC) layer, Radio link control (RLC) layer, Radio Resource Control (RRC) layer).

Figure 4:
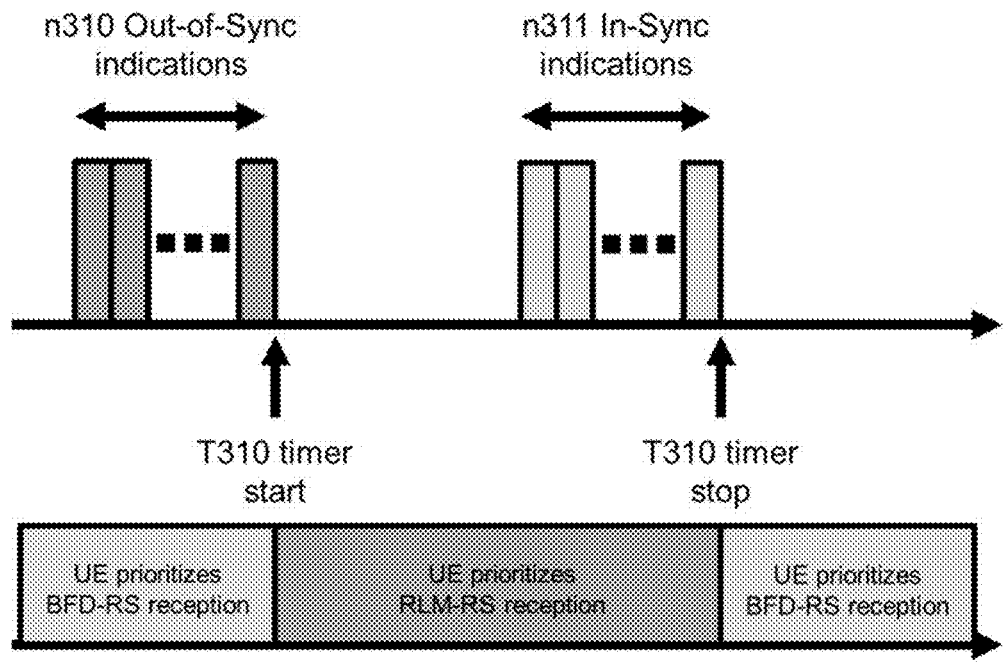
FIG. 4 illustrates an embodiment rule for prioritizing a Radio Link Monitoring (RLM) reference signal.

Referring to FIG. 4, if n310 consecutive OOS indications are received, the UE starts a T310 timer. Once the T310 timer has started, if n311 consecutive IS indications are received, the UE may stop the T310 timer. Otherwise the UE may declare a Radio Link Failure. In this embodiment, the UE may prioritize reception of the RLM reference signal when the T310 timer of the UE is triggered and is still running.

Figure 5:
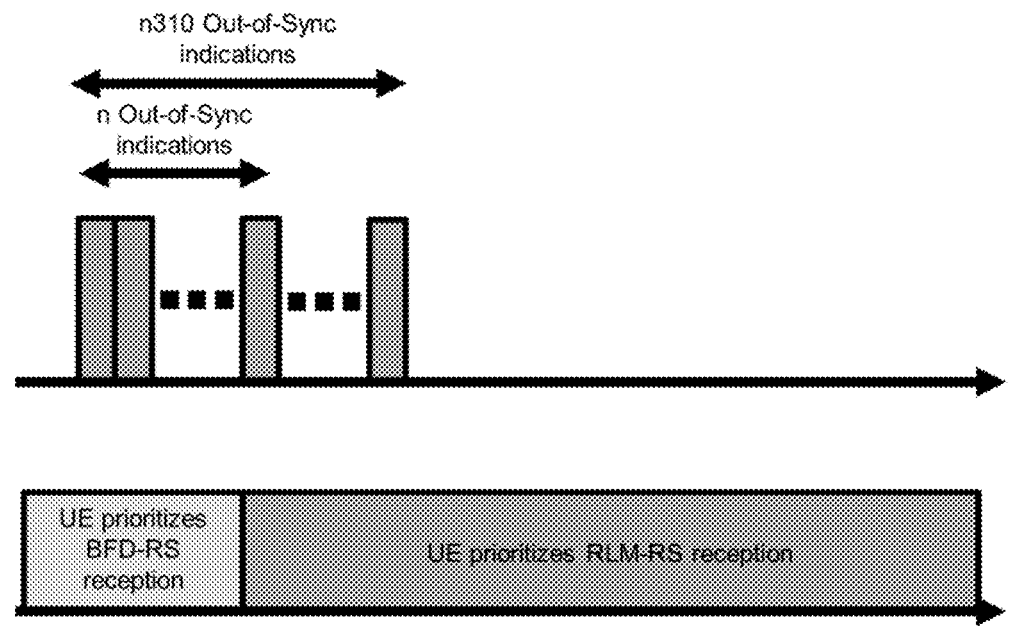
FIG. 5 illustrates another embodiment rule for prioritizing an RLM reference signal.

In another embodiment illustrated in FIG. 5, the UE may prioritize reception of the RLM reference signal when a higher layer of the UE has received n consecutive Out-of-Sync indications from a lower layer of the UE, where n is less than n310.

Figure 6:
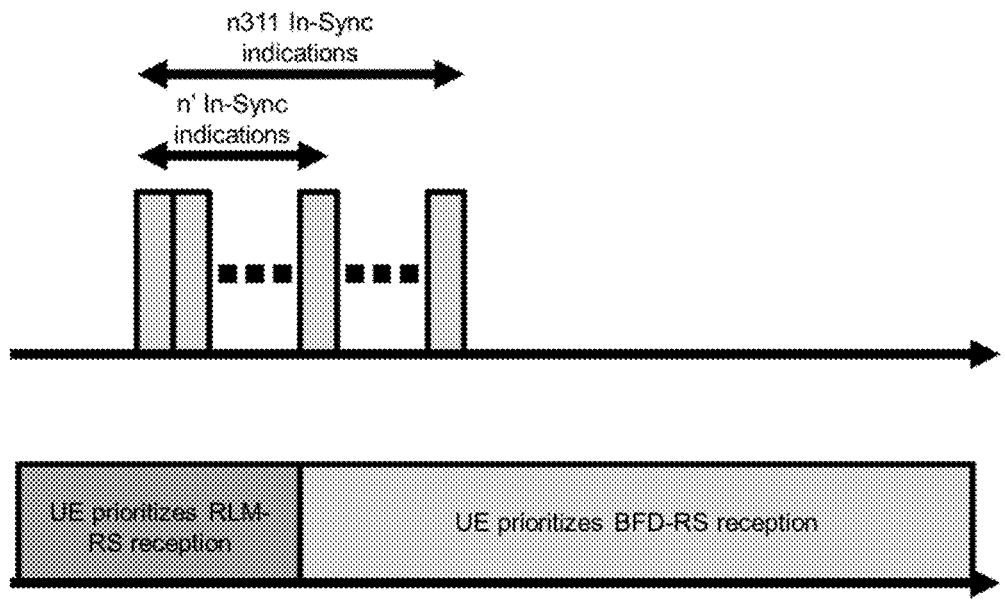
FIG. 6 illustrates another embodiment rule for prioritizing an RLM reference signal.

In another embodiment illustrated in FIG. 6, the UE may prioritize reception of the RLM reference signal when a higher layer of the UE has received less than n' consecutive In-Sync indications from a lower layer of the UE, where n' is less than n311.

In another embodiment, the first reference signal may be a Beam Failure Detection (BFD) reference signal. The second reference signal may be but not limited to an RLM reference signal, a BFR reference signal, or an RRM reference signal.

Figure 7:
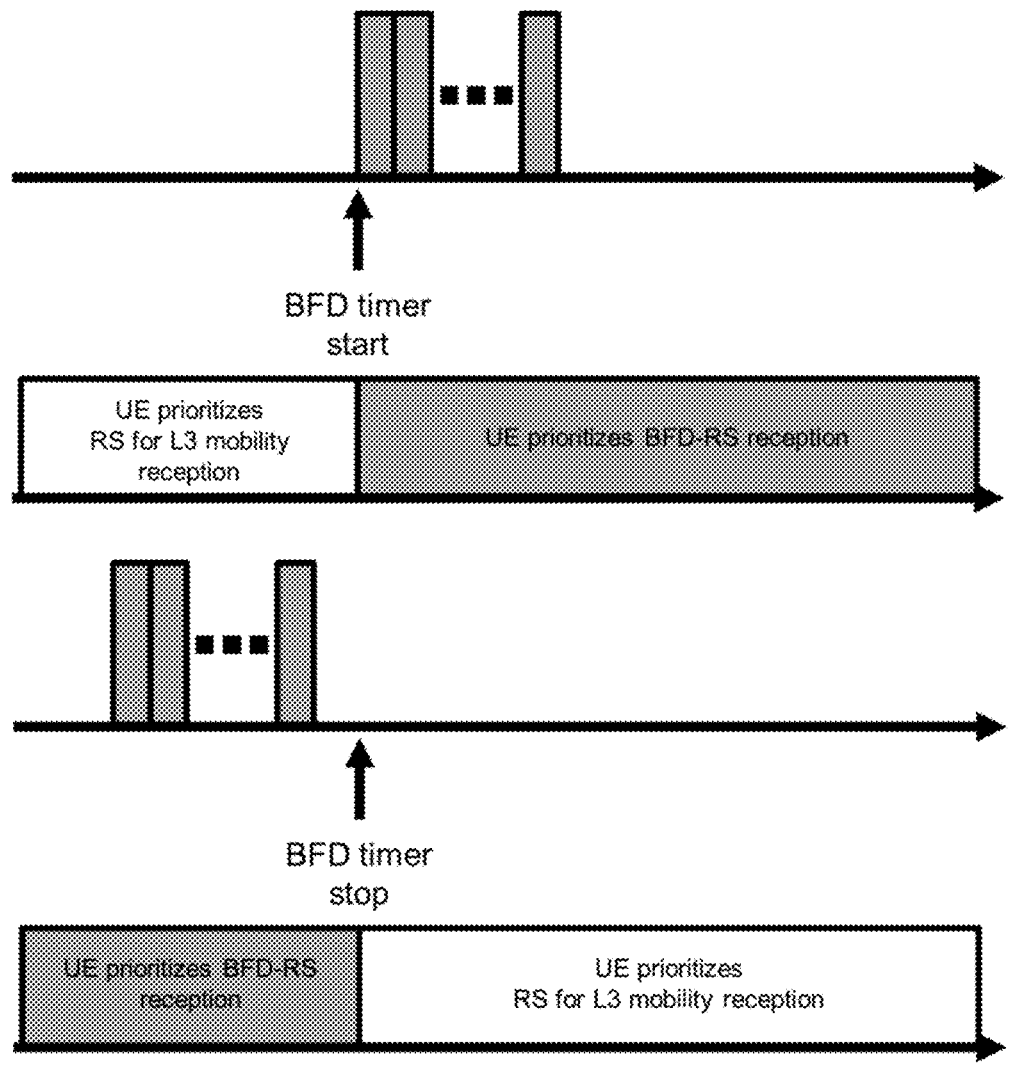
FIG. 7 illustrates an embodiment rule for prioritizing a Beam Failure Detection (BFD) reference signal.

BFD may serve a purpose of indicating a serving base station that a beam failure was detected on a Synchronization Signal Block (SSB) or a Channel State Information (CSI) reference signal. As shown in FIG. 6, if a beam failure instance is detected, the UE may start a BFD timer. If a number of beam failures (e.g., beamFailureInstanceMaxCount as defined in 3GPP standards) are detected, the UE may start a BFR timer and perform a BFR procedure. As illustrated in FIG. 7, the UE may prioritize reception of the BFD reference signal when a BFD timer of the UE has been triggered and is still running.

Figure 8:
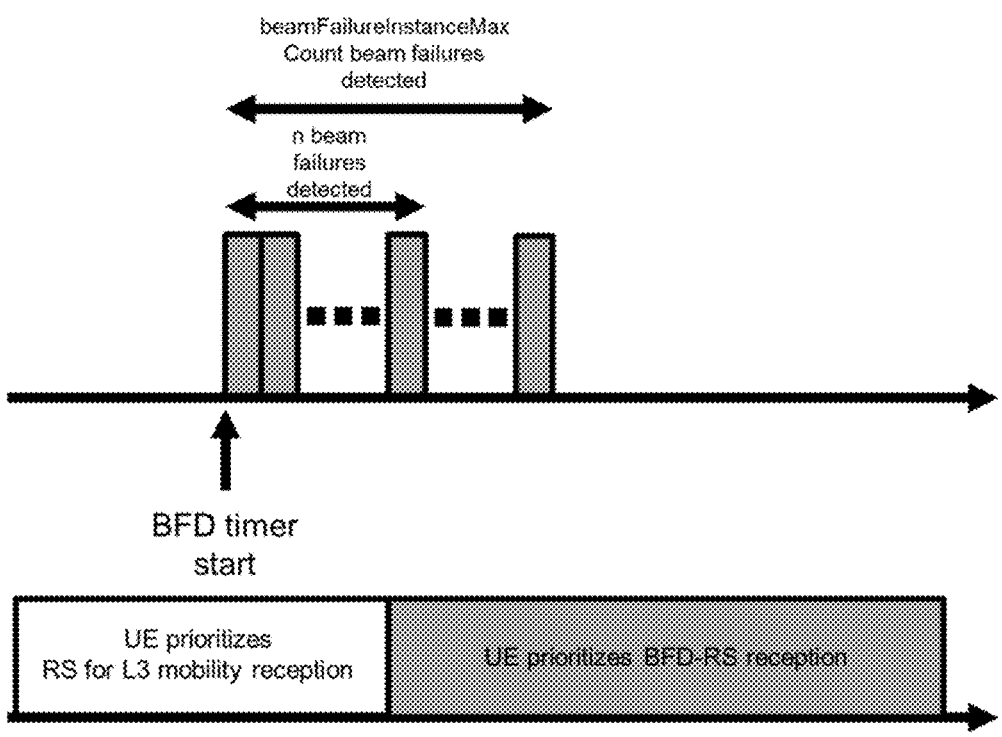
FIG. 8 illustrates another embodiment rule for prioritizing a BFD reference signal.

In another embodiment illustrated in FIG. 8, the UE may prioritize reception of the BFD reference signal when a higher layer of the UE has received at least n beam failure indications from a lower layer of the UE, where n is less than a threshold value (e.g., beamFailureInstanceMaxCount as defined in 3GPP standards).

Figure 9:
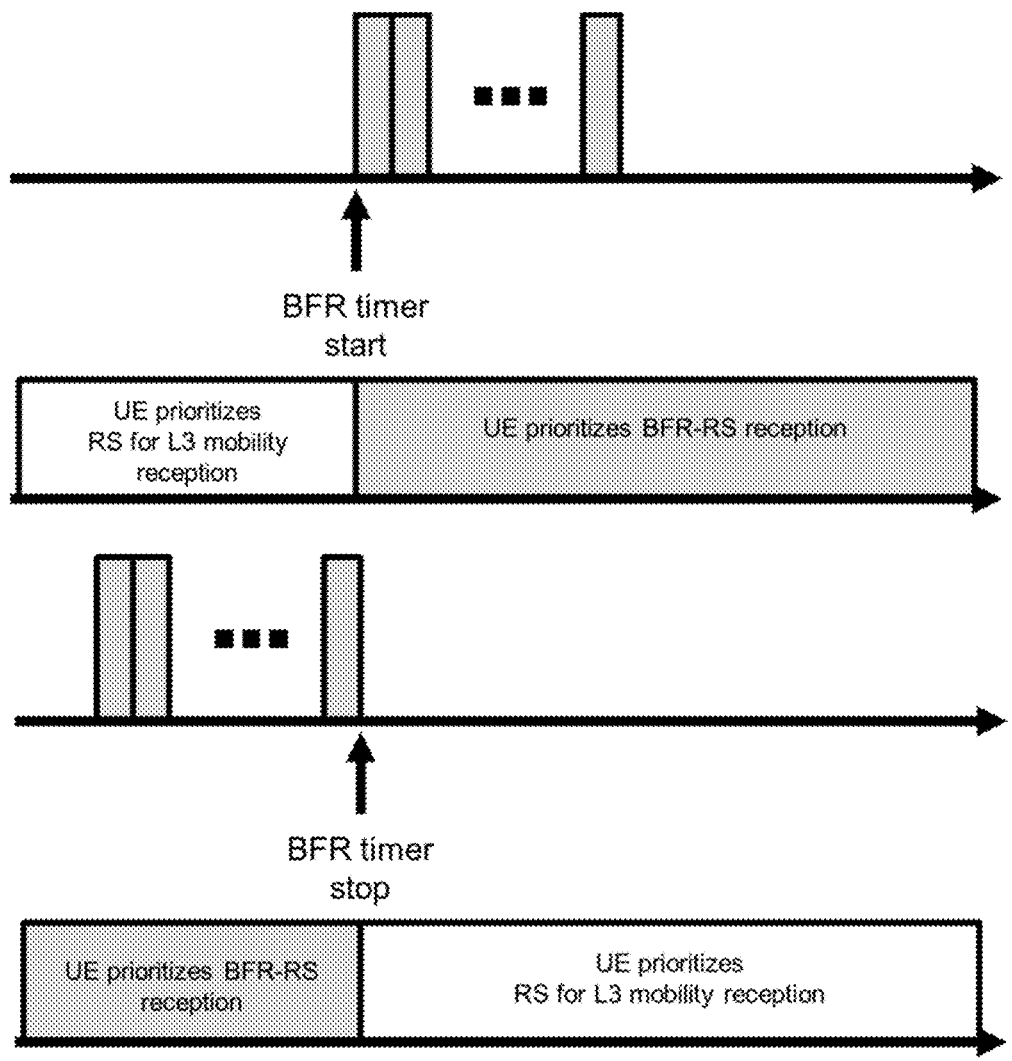
FIG. 9 illustrates an embodiment rule for prioritizing a Beam Failure Recovery (BFR) reference signal.

In another embodiment, the first reference signal may be a Beam Failure Recovery (BFR) reference signal. The second reference signal may be but not limited to an RLM reference signal, a BFD reference signal, or an RRM reference signal. As illustrated in FIG. 9, the UE may prioritize reception of the BFR reference signal when a BFR timer of the UE has been triggered and is still running.

Figure 10:
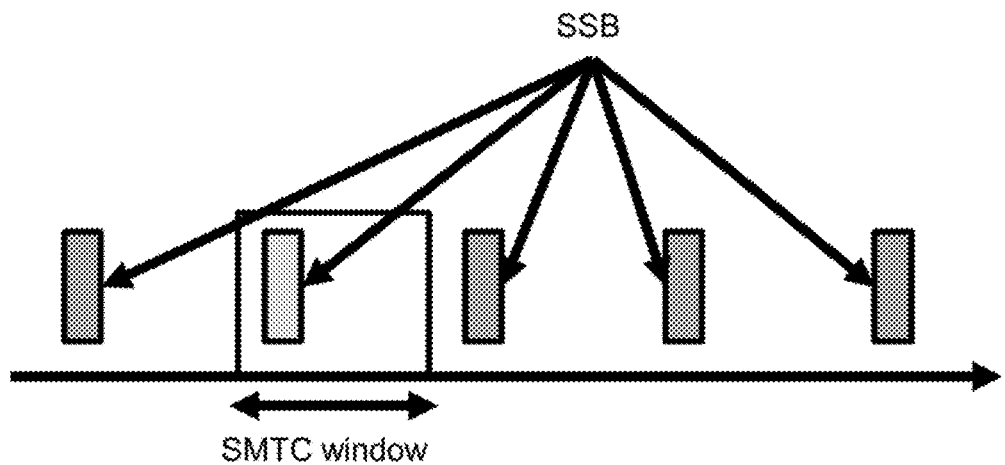
FIG. 10 illustrates an embodiment rule for prioritizing a Layer 3 (L3) mobility reference signal.

In another embodiment, the first reference signal may be a Resource Management (RRM) reference signal (also referred to as an L3 mobility reference signal). The second reference signal may be but not limited to an RLM reference signal. The UE may use RRM (or L3 mobility) to perform intra-frequency/inter-frequency Reference Signal Received Power (RSRP)/Reference Signal Received Quality (RSRQ) measurements of serving and neighboring cells. A same SSB may be configured for both an RLM process and an L3 mobility process. As shown in FIG. 10, the UE may prioritize reception of the SSB for the L3 mobility process when the UE is configured to receive the SSB within an SSB based RRM measurement timing configuration (SMTC) window. The UE may prioritize reception of the SSB for the RLM process when the UE is configured to receive the SSB outside an SMTC window.

In another embodiment, an RLM reference signal and an L3 mobility reference signal may be mapped to a same OFDM symbol. Both the RLM reference signal and the L3 mobility reference signal may have a Quasi-Colocation (QCL) association of Type D, where the QCL association means that UE may assume that both reference signals have the same spatial reception (RX) parameters when performing measurements on those reference signals. In this case, the UE may receive both the RLM reference signal and the L3 mobility reference signal, and perform intended measurement tasks on both reference signals.

Figure 11:
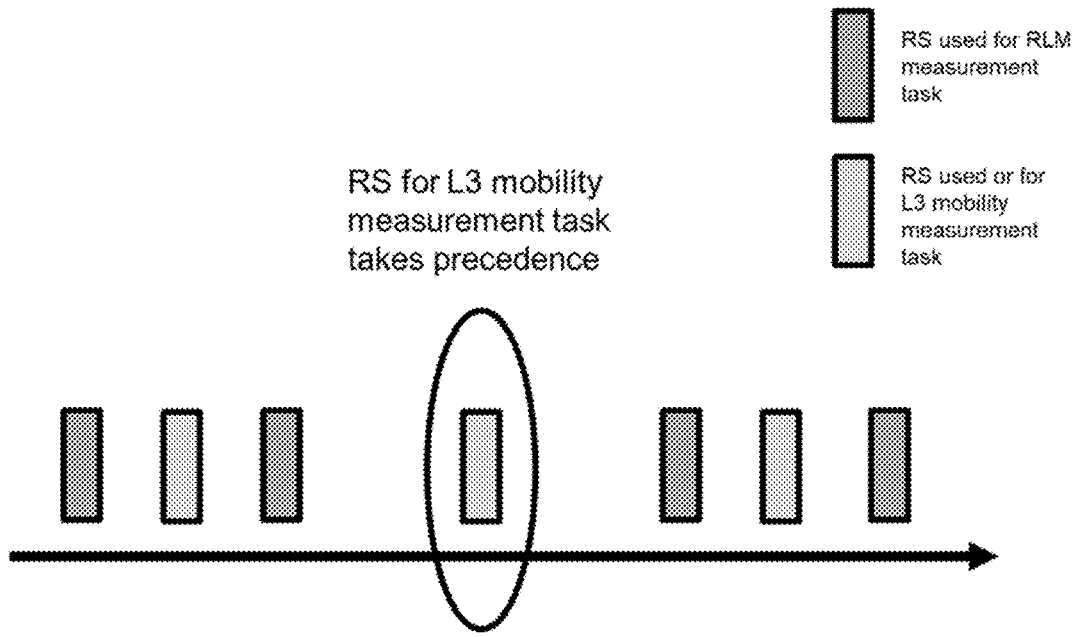
FIG. 11 illustrates another embodiment rule for prioritizing an L3 mobility reference signal.

In another embodiment, an RLM reference signal and an L3 mobility reference signal may be mapped to a same OFDM symbol or adjacent OFDM symbols. In an example illustrated in FIG. 11, the UE may prioritize reception of L3 mobility reference signal. Optionally, the UE may receive both the RLM reference signal and the L3 mobility reference signal in accordance with the capabilities of the UE.

In another embodiment, when a same CSI reference signal is configured for both the RLM process and the L3 mobility process, the UE may prioritize reception of the CSI reference signal for the L3 mobility process.

Figure 12:
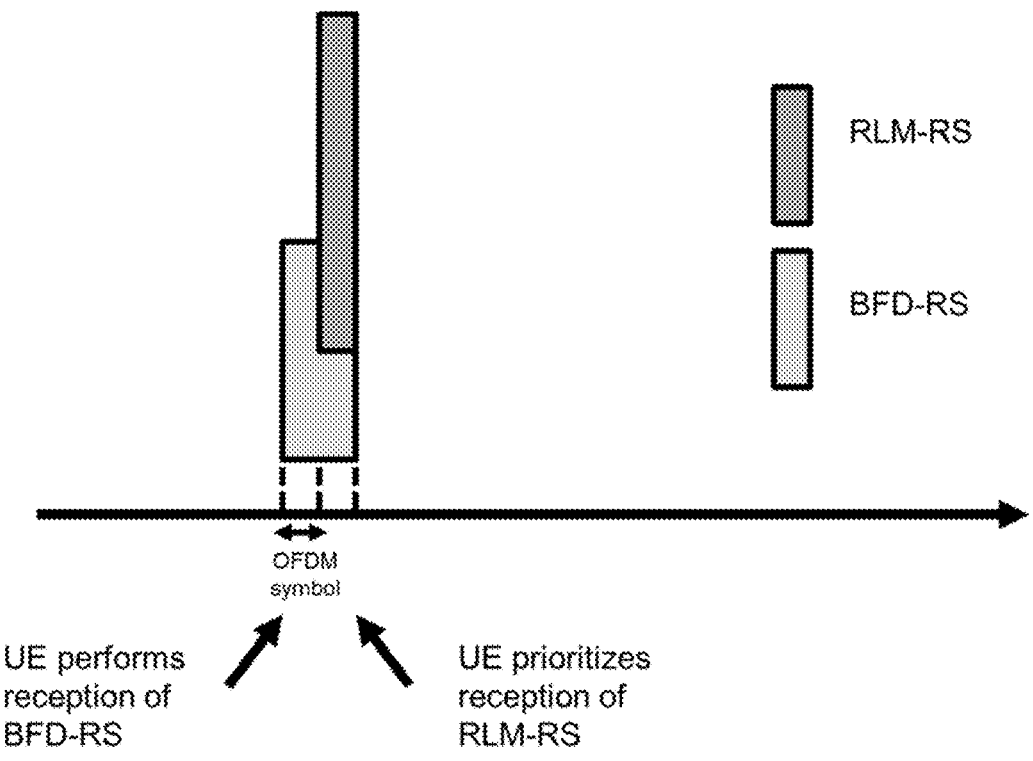
FIG. 12 illustrates another embodiment rule for prioritizing an RLM reference signal.

In another embodiment illustrated in FIG. 12, the first reference signal is an RLM reference signal, and the second reference signal is a BFD reference signal. When the RLM reference signal and the BFD reference signal are to be transmitted over a same OFDM symbol and on overlapping resources, the UE prioritizes reception of the RLM reference signal. When the RLM reference signal and the BFD reference signal are to be transmitted over the same OFDM symbol but not on overlapping resources, the UE may also prioritize reception of the RLM reference signal. When the RLM reference signal and the BFD reference signal are to be transmitted over different OFDM symbols, the UE may receive both the RLM reference signal and the BFD reference signal, and perform intended operations/measurements on both reference signals.

Figure 13:
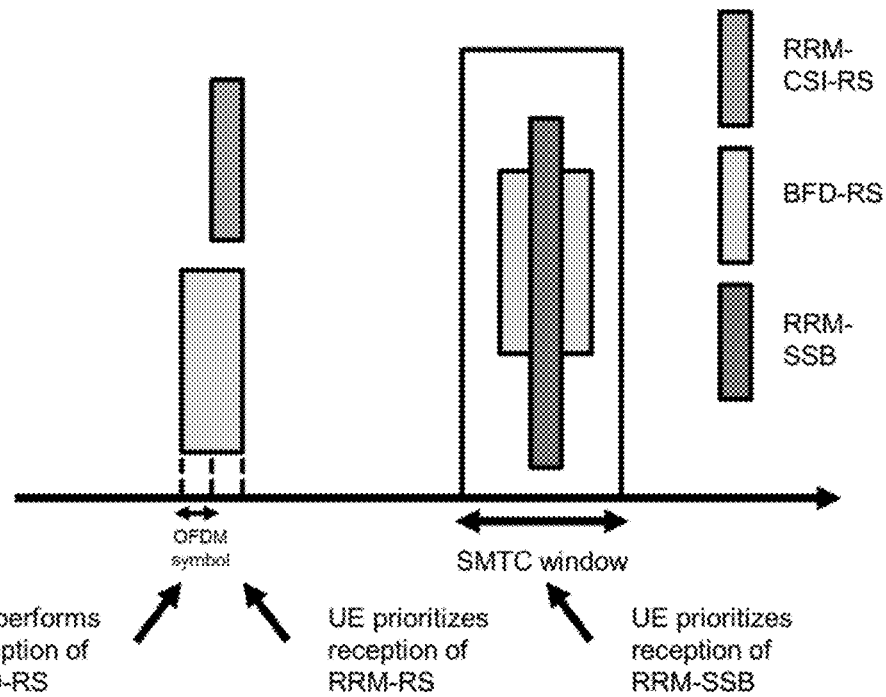
FIG. 13 illustrates another embodiment rule for prioritizing an L3 mobility reference signal.

In another embodiment illustrated in FIG. 13, the first reference signal is a L3 mobility reference signal and the second reference signal is a BFD reference signal. The L3 mobility reference signal may be a SSB. When the SSB and the BFD reference signal are to be transmitted over a same OFDM symbol and on overlapping resources inside a SMTC window, the UE prioritizes reception of the SSB. Alternatively, the L3 mobility reference signal may be a CSI reference signal. When the CSI reference signal and the BFD reference signal are to be transmitted over a same OFDM symbol and on overlapping resources outside a SMTC window, the UE prioritizes reception of the CSI reference signal. When the L3 reference signal and the BFD reference signal are to be transmitted over a same OFDM symbol but not on overlapping resources, the UE may prioritize reception of the L3 mobility reference signal. When the L3 reference signal and the BFD reference signal are to be transmitted over different OFDM symbols, the UE receives and performs intended operations/measurements on both reference signals.

Figure 14:
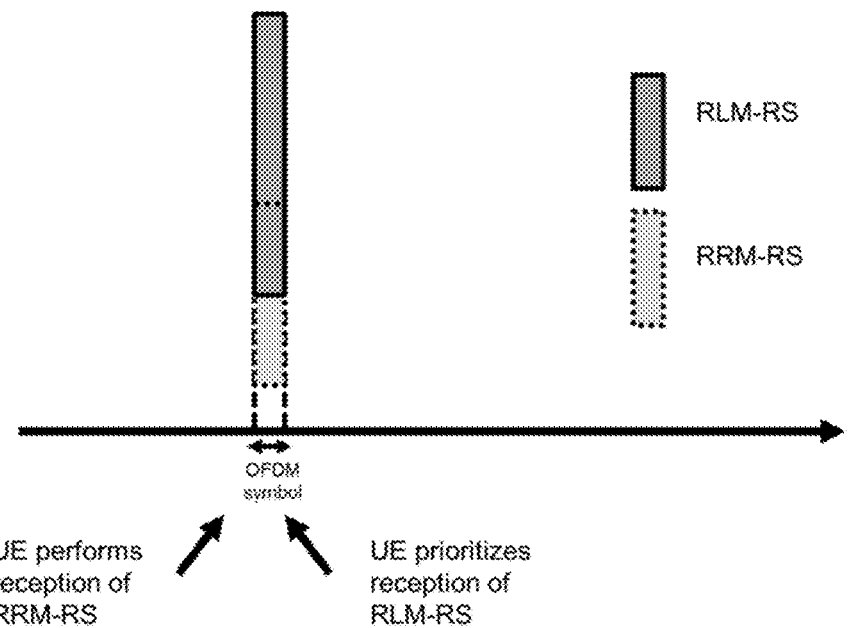
FIG. 14 illustrates another embodiment rule for prioritizing an RLM reference signal.

In another embodiment illustrated in FIG. 14, the first reference signal is an RLM reference signal, and the second reference signal is an L3 mobility reference signal. When the RLM reference signal and the L3 mobility reference signal are to be transmitted on a same OFDM symbol and on overlapping resources, the UE prioritizes reception of the RLM reference signal. When the RLM reference signal and the L3 mobility reference signal are to be transmitted on a same OFDM symbol but not on overlapping resources, the UE prioritizes reception of the RLM reference signal. Alternatively, when the RLM reference signal and the L3 mobility reference signal are to be transmitted on different OFDM symbols, the UE receives both the RLM reference signal and the L3 mobility reference signal, and performs intended operations/measurements on of both reference signals.

Figure 15:
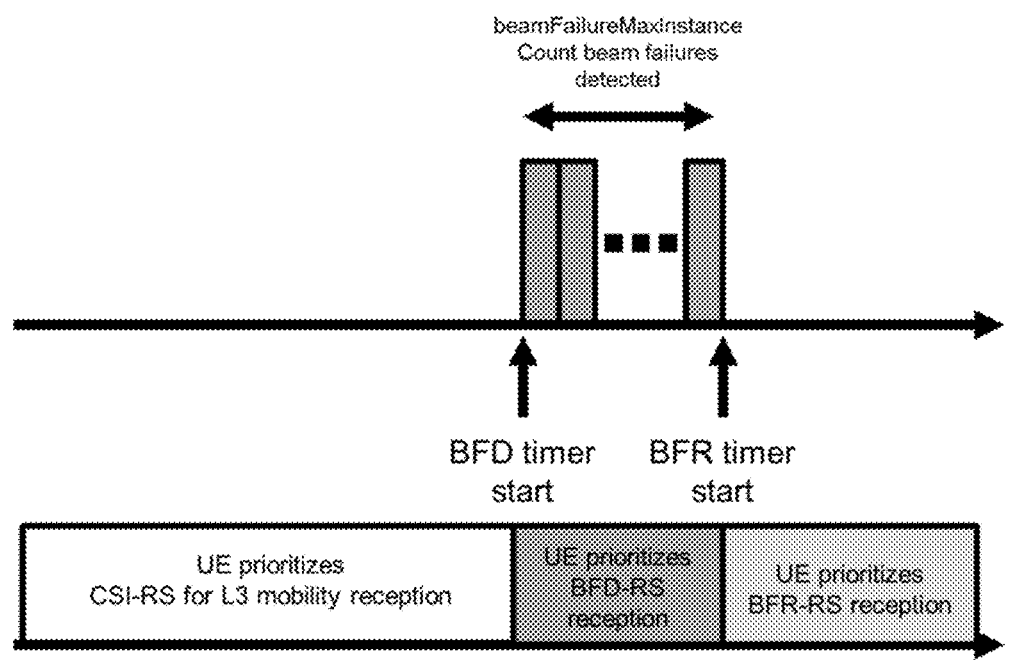
FIG. 15 illustrates an embodiment of applying a combination of rules for prioritizing a reference signal.

The UE may apply a combination of the above rules. In one embodiment illustrated in FIG. 15, the UE prioritizes reception of a CSI reference signal for an L3 mobility process. When a BFD timer is triggered, the UE prioritizes reception of a BFD reference signal. A BFR timer is triggered after a number of beam failures (e.g., beamFailureMaxInstanceCount) are detected, then the UE prioritizes reception of a BFR reference signal.

Figure 16:
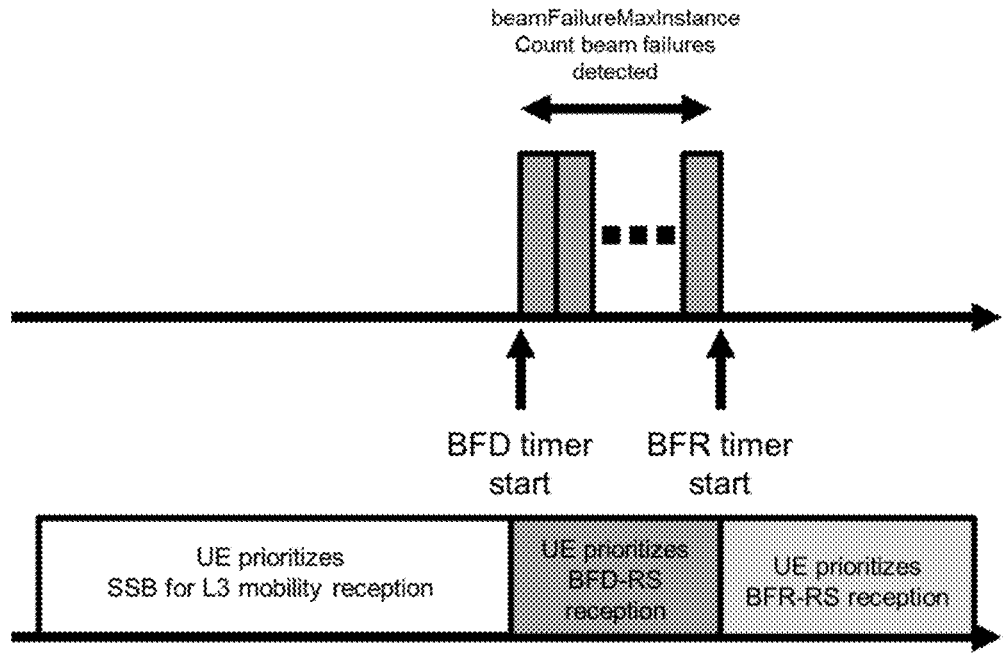
FIG. 16 illustrates an embodiment of applying another combination of rules for prioritizing a reference signal.

In another embodiment illustrated in FIG. 16, the UE prioritizes reception of a SSB reference signal for a L3 mobility process. When a BFD timer is triggered, the UE prioritizes reception of a BFD reference signal. A BFR timer is triggered after a number of beam failures (e.g., beamFailureMaxInstanceCount) are detected, then the UE prioritizes reception of a BFR reference signal.

Figure 17:
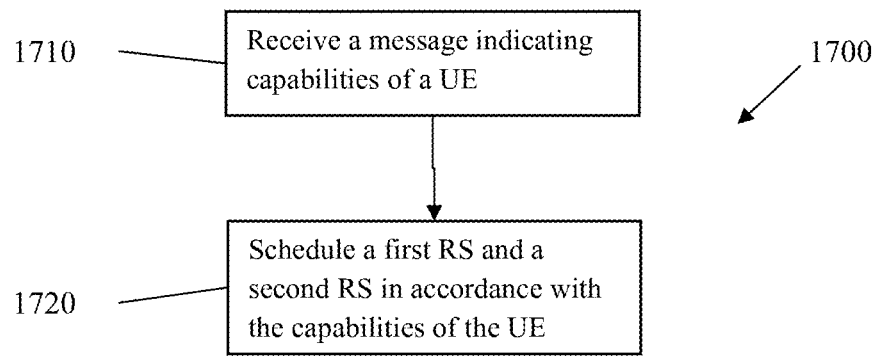
FIG. 17 illustrates an embodiment reference signal scheduling method performed by a network device.

FIG. 17 illustrates an example of a reference signal scheduling method 1700 performed by a network device. As shown, at step 1710, where a network device receives a message from a UE. The message may indicate capabilities of the UE. At step 1720, the network device scheduling a first reference signal and a second reference signal for the UE, and the scheduling is based on the capabilities of the UE. In one embodiment, the first reference signal configured to be transmitted to the UE over a first resource. The second reference signal is prevented from being transmitted to the UE over a second resource when the UE does not support simultaneous reception of both the first reference signal over the first resource and the second reference signal over the second resource. In another embodiment, the second reference signal is configured to be transmitted to the UE over a second resource when the UE supports simultaneous reception of both the first reference signal over the first resource and the second reference signal over the second resource.

Figure 18A:
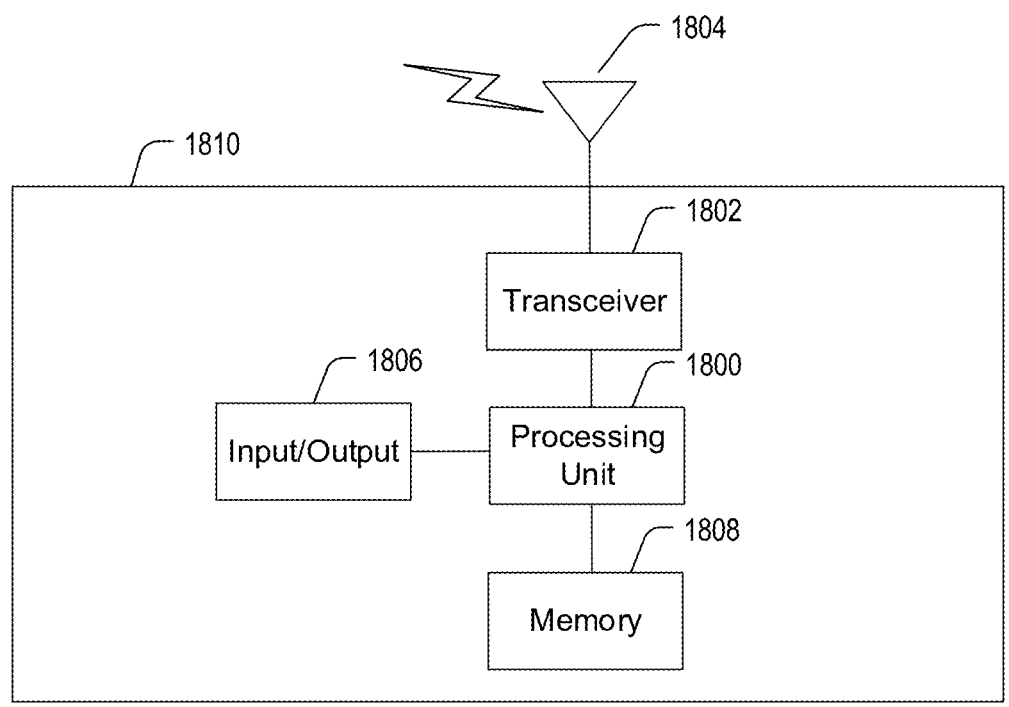
FIG. 18A-B illustrate block diagrams of embodiment devices.
Figure 18B:
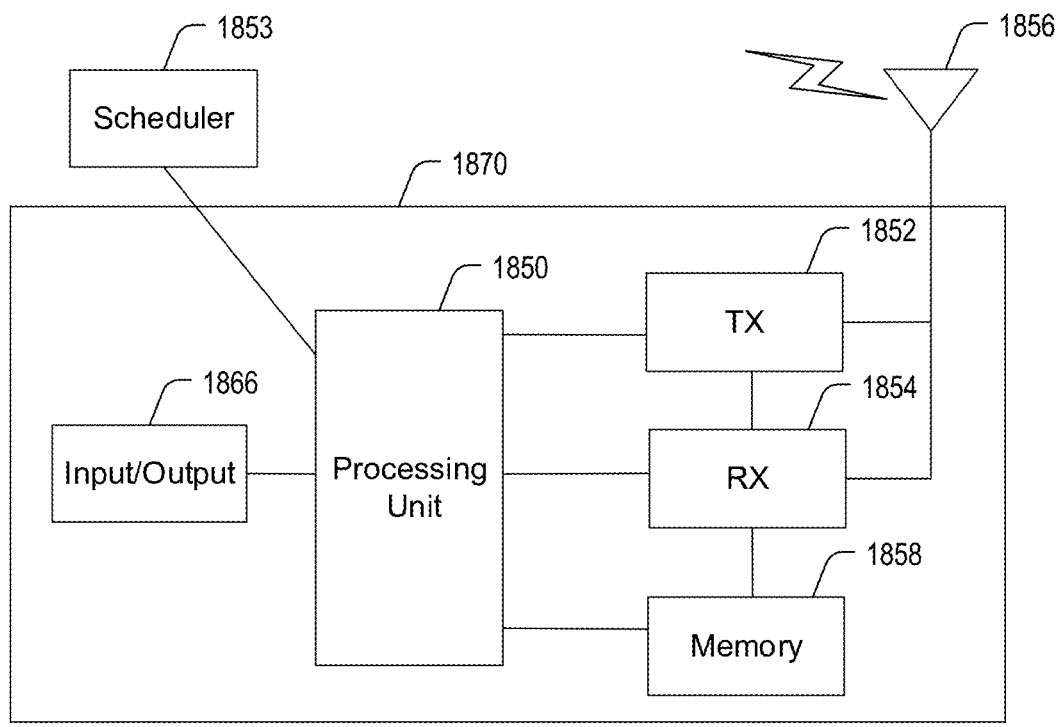

FIGS. 18A and 18B illustrate example devices that may implement the methods and teachings according to this disclosure. In particular, FIG. 18A illustrates an example UE 1810, and FIG. 18B illustrates an example base station 1870.

As shown in FIG. 18A, the UE 1810 includes at least one processing unit 1800. The processing unit 1800 implements various processing operations of the UE 1810. For example, the processing unit 1800 could perform signal coding, data processing, power control, input/output processing, or any other functionality enabling the UE 1810 to operate in the network. The processing unit 1800 may also be configured to implement some or all of the functionality and/or embodiments described in more detail above. Each processing unit 1800 includes any suitable processing or computing device configured to perform one or more operations. Each processing unit 1800 could, for example, include a microprocessor, microcontroller, digital signal processor, field programmable gate array, or application specific integrated circuit.

The UE 1810 also includes at least one transceiver 1802. The transceiver 1802 is configured to modulate data or other content for transmission by at least one antenna or Network Interface Controller (NIC) 1804. The transceiver 1802 is also configured to demodulate data or other content received by the at least one antenna 1804. Each transceiver 1802 includes any suitable structure for generating signals for wireless transmission and/or processing signals received. Each antenna 1804 includes any suitable structure for transmitting and/or receiving wireless signals. One or multiple transceivers 1802 could be used in the UE 1810, and one or multiple antennas 1804 could be used in the UE 1810. Although shown as a single functional unit, a transceiver 1802 could also be implemented using at least one transmitter and at least one separate receiver.

The UE 1810 further includes one or more input/output devices 1806 or interfaces. The input/output devices 1806 permit interaction with a user or other devices in the network. Each input/output device 1806 includes any suitable structure for providing information to or receiving information from a user, such as a speaker, microphone, keypad, keyboard, display, or touch screen, including network interface communications.

In addition, the UE 1810 includes at least one memory 1808. The memory 1808 stores instructions and data used, generated, or collected by the UE 1810. For example, the memory 1808 could store software instructions or modules configured to implement some or all of the functionality and/or embodiments described above and that are executed by the processing unit(s) 1800. Each memory 1808 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. It is understood that the components as shown in FIG. 18A is for the purpose of illustration and the UE 1810 may include part or all of the components illustrated in FIG. 18A.

As shown in FIG. 18B, the base station 1870 includes at least one processing unit 1850, at least one transmitter 1852, at least one receiver 1854, one or more antennas 1856, at least one memory 1858, and one or more input/output devices or interfaces 1866. A transceiver, not shown, may be used instead of the transmitter 1852 and receiver 1854. A scheduler 1853 may be coupled to the processing unit 1850. The scheduler 1853 may be included within or operated separately from the base station 1870. The processing unit 1850 implements various processing operations of the base station 1870, such as signal coding, data processing, power control, input/output processing, or any other functionality. The processing unit 1850 can also be configured to implement some or all of the functionality and/or embodiments described in more detail above. Each processing unit 1850 includes any suitable processing or computing device configured to perform one or more operations. Each processing unit 1850 could, for example, include a microprocessor, microcontroller, digital signal processor, field programmable gate array, or application specific integrated circuit. It is understood that the components as shown in FIG. 18B is for the purpose of illustration and the base station 1870 may include part or all of the components illustrated in FIG. 18B.

Each transmitter 1852 includes any suitable structure for generating signals for wireless transmission to one or more UEs or other devices. Each receiver 1854 includes any suitable structure for processing signals received from one or more UEs or other devices. Although shown as separate components, at least one transmitter 1852 and at least one receiver 1854 could be combined into a transceiver. Each antenna 1856 includes any suitable structure for transmitting and/or receiving wireless or wired signals. Although a common antenna 1856 is shown here as being coupled to both the transmitter 1852 and the receiver 1854, one or more antennas 1856 could be coupled to the transmitter(s) 1852, and one or more separate antennas 1856 could be coupled to the receiver(s) 1854. Each memory 1858 includes any suitable volatile and/or non-volatile storage and retrieval device(s) such as those described above in connection to the UE 1810. The memory 1858 stores instructions and data used, generated, or collected by the base station 1870. For example, the memory 1858 could store software instructions or modules configured to implement some or all of the functionality and/or embodiments described above and that are executed by the processing unit(s) 1850.

Each input/output device 1866 permits interaction with a user or other devices in the network. Each input/output device 1866 includes any suitable structure for providing information to or receiving/providing information from a user, including network interface communications.

Figure 19:
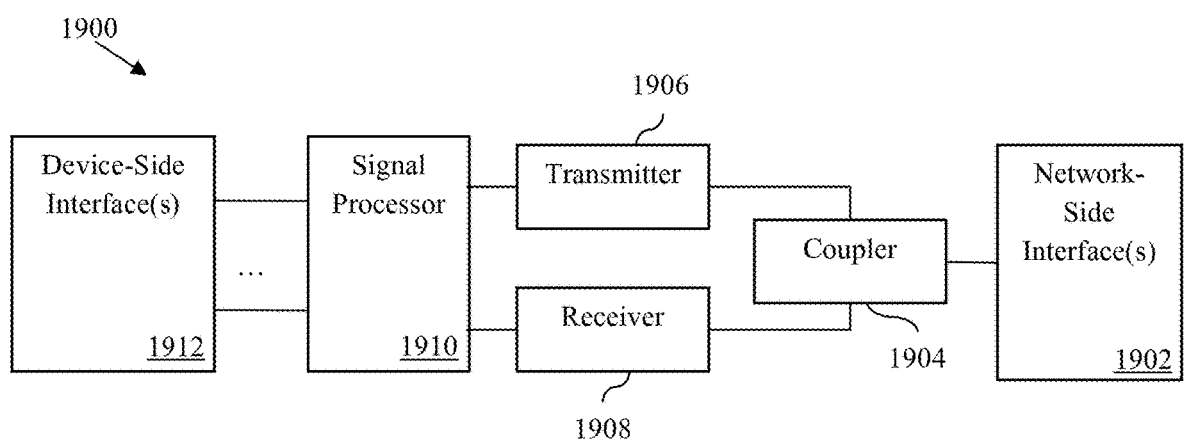
FIG. 19 illustrates a block diagram of an embodiment transceiver.

FIG. 19 illustrates a block diagram of a transceiver 1900 adapted to transmit and receive signaling over a telecommunications network. The transceiver 1900 may be installed in a host device. As shown, the transceiver 1900 comprises a network-side interface 1902, a coupler 1904, a transmitter 1906, a receiver 1908, a signal processor 1910, and a device-side interface 1912. The network-side interface 1902 may include any component or collection of components adapted to transmit or receive signaling over a wireless or wireline telecommunications network. The coupler 1904 may include any component or collection of components adapted to facilitate bi-directional communication over the network-side interface 1902. The transmitter 1906 may include any component or collection of components (e.g., up-converter, power amplifier, etc.) adapted to convert a baseband signal into a modulated carrier signal suitable for transmission over the network-side interface 1902. The receiver 1908 may include any component or collection of components (e.g., down-converter, low noise amplifier, etc.) adapted to convert a carrier signal received over the network-side interface 1902 into a baseband signal. The signal processor 1910 may include any component or collection of components adapted to convert a baseband signal into a data signal suitable for communication over the device-side interface(s) 1912, or vice-versa. The device-side interface(s) 1912 may include any component or collection of components adapted to communicate data-signals between the signal processor 1910 and components within the host device (e.g., the processing system 1800, local area network (LAN) ports, etc.).

The transceiver 1900 may transmit and receive signaling over any type of communications medium. In some embodiments, the transceiver 1900 transmits and receives signaling over a wireless medium. For example, the transceiver 1900 may be a wireless transceiver adapted to communicate in accordance with a wireless telecommunications protocol, such as a cellular protocol (e.g., LTE, etc.), a wireless local area network (WLAN) protocol (e.g., Wi-Fi, etc.), or any other type of wireless protocol (e.g., Bluetooth, near field communication (NFC), etc.). In such embodiments, the network-side interface 1902 comprises one or more antenna/radiating elements. For example, the network-side interface 1902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

In other embodiments, outlined below, the network's behavior is bound by restrictions on the scheduling availabilities where it is allowed to transmit a reference signal in a given resource towards a given UE.

Scheduling availabilities/restrictions (RLM-RS—same subcarrier spacing)

In a first embodiment, the network is bound by restrictions on scheduling availabilities that apply due to the UE performing signal processing tasks related to radio link monitoring functions. The first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). When the UE is performing radio link monitoring, the network applies scheduling restrictions due to the UE not expecting to receive a second reference signal on the symbols where the RLM-RS to be measured for radio link monitoring is mapped.

In another embodiment, the network is bound by restrictions on scheduling availabilities that apply due to the UE performing signal processing tasks related to radio link monitoring functions. The first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS). The first reference signal and the second reference signal have the same subcarrier spacing and are transmitted in FR2. When the UE is performing radio link monitoring and the UE has received more than n consecutive Out-of-Sync (OOS) indications from the lower layers, scheduling restrictions apply due to the UE not expecting to receive a second reference signal on the symbols where the RLM-RS to be measured for radio link monitoring is mapped. n is a number lower than n310 and may be configured through higher-layer signaling (e.g. RRC, MAC-CE).

In another embodiment, the network is bound by restrictions on scheduling availabilities that apply due to the UE performing signal processing tasks related to radio link monitoring functions. The first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS). The first reference signal and the second reference signal have the same subcarrier spacing and are transmitted in FR2. When the UE is performing radio link monitoring and the T310 timer has been configured by higher-layer signaling and is running, scheduling restrictions apply due to the UE not expecting to receive a second reference signal on the symbols where the RLM-RS to be measured for radio link monitoring is mapped.

In another embodiment, the network is bound by restrictions on scheduling availabilities that apply due to the UE performing signal processing tasks related to radio link monitoring functions. The first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS). The first reference signal and the second reference signal have the same subcarrier spacing and are transmitted in FR2. When the UE is performing radio link monitoring and the T310 timer has been configured and is running and the UE has received less than n' In-Sync (IS) indications from the lower layers, scheduling restrictions apply due to the UE not expecting to receive a second reference signal on the symbols where the RLM-RS to be measured for radio link monitoring is mapped. n' is a number lower than n311 and may be configured via higher-layer signaling (e.g. RRC, MAC-CE).

In another embodiment, the network is bound by restrictions on scheduling availabilities that apply due to the UE performing signal processing tasks related to radio link monitoring functions. The first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS). The first reference signal and the second reference signal have the same subcarrier spacing and are transmitted in FR2. When the UE is performing radio link monitoring and the first and second reference signals are not QCL Type D, scheduling restrictions apply due to the UE not expecting to receive a second reference signal on the symbols where the RLM-RS to be measured for radio link monitoring is mapped.

In another embodiment, if the first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS) and the two reference signals are transmitted on FR1, the network is not bound by any restrictions on scheduling availabilities due to the UE performing signal processing tasks related to radio link monitoring functions.

In another embodiment, if the first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS) and the UE supports receiving a first reference signal and a second reference signal concurrently transmitted on FR2, the network is not bound by any restrictions on scheduling availabilities due to the UE performing signal processing tasks related to radio link monitoring functions.

In another embodiment, if the first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS) and the first and second reference signals are being transmitted on FR2 and are Quasi-Colocated (QCL) Type D, the network is not bound by any restrictions on scheduling availabilities due to the UE performing signal processing tasks related to radio link monitoring functions.

The aforementioned embodiments are equally applicable to Frequency Range 1 (FR1) and to Frequency Range 2 (FR2). The aforementioned embodiments are equally applicable to serving cells that are Primary Cells (PCell), Primary Secondary Cells (PSCell), Secondary Cells (SCell) and neighboring cells. The applicability of the aforementioned embodiments relies on the capabilities supported by the UE, such as (but not limited to): the UE supporting concurrent reception of signals in FR1; the UE supporting concurrent reception of signals in FR2; the UE supporting concurrent reception of signals on the same subcarrier spacing; the UE supporting concurrent reception of signals on different subcarrier spacing.

Scheduling availabilities/restrictions (RLM-RS–different subcarrier spacing)

In a first embodiment, the network is bound by restrictions on scheduling availabilities that apply due to the UE performing signal processing tasks related to radio link monitoring functions. The first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS). The first reference signal and the second reference signal have different subcarrier spacing and are transmitted in Frequency Range 2 (FR2). The UE does not support concurrently receiving the first reference signal over a first subcarrier spacing and the second reference signal over a second subcarrier spacing. When the UE is performing radio link monitoring, the network applies scheduling restrictions due to the UE not expecting to receive a second reference signal on the symbols where the RLM-RS to be measured for radio link monitoring is mapped.

In another embodiment, the network is bound by restrictions on scheduling availabilities that apply due to the UE performing signal processing tasks related to radio link monitoring functions. The first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS). The first reference signal and the second reference signal have different subcarrier spacing and are transmitted in FR2. The UE does not support concurrently receiving the first reference signal over a first subcarrier spacing and the second reference signal over a second subcarrier spacing. When the UE is performing radio link monitoring and the UE has received more than n consecutive Out-of-Sync (OOS) indications from the lower layers, scheduling restrictions apply due to the UE not expecting to receive a second reference signal on the symbols where the RLM-RS to be measured for radio link monitoring is mapped. n is a number lower than n310 and may be configured through higher-layer signaling (e.g. RRC, MAC-CE).

In another embodiment. the network is bound by restrictions on scheduling availabilities that apply due to the UE performing signal processing tasks related to radio link monitoring functions. The first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS). The first reference signal and the second reference signal have different subcarrier spacing and are transmitted in FR2. The UE does not support concurrently receiving the first reference signal over a first subcarrier spacing and the second reference signal over a second subcarrier spacing. When the UE is performing radio link monitoring and the T310 timer has been configured by higher-layer signaling and is running, scheduling restrictions apply due to the UE not expecting to receive a second reference signal on the symbols where the RLM-RS to be measured for radio link monitoring is mapped.

In another embodiment, the network is bound by restrictions on scheduling availabilities that apply due to the UE performing signal processing tasks related to radio link monitoring functions. The first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS). The first reference signal and the second reference signal have the same subcarrier spacing and are transmitted in FR2. The UE does not support concurrently receiving the first reference signal over a first subcarrier spacing and the second reference signal over a second subcarrier spacing. When the UE is performing radio link monitoring and the T310 timer has been configured and is running and the UE has received less than n' In-Sync (IS) indications from the lower layers, scheduling restrictions apply due to the UE not expecting to receive a second reference signal on the symbols where the RLM-RS to be measured for radio link monitoring is mapped. n' is a number lower than n311 and may be configured via higher-layer signaling (e.g. RRC, MAC-CE).

In another embodiment, if the first reference signal is a RLM-RS and the second reference signal is some other reference signal (e.g. BFD-RS, BFR-RS, SSB for L3 mobility, CSI-RS for L3 mobility, PDCCH DMRS, PDSCH DMRS) and the UE supports receiving a first reference signal and a second reference signal on different subcarrier spacings concurrently transmitted on FR2, the network is not bound by any restrictions on scheduling availabilities due to the UE performing signal processing tasks related to radio link monitoring functions.

The aforementioned embodiments are applicable to Frequency Range 1 (FR1) and to Frequency Range 2 (FR2). The aforementioned embodiments are applicable to serving cells that are Primary Cells (PCell), Primary Secondary Cells (PSCell), Secondary Cells (SCell) and neighboring cells. The applicability of the aforementioned embodiments relies on the UE's capabilities, such as (but not limited to): the UE supporting concurrent reception of signals in FR1; the UE supporting concurrent reception of signals in FR2; the UE supporting concurrent reception of signals on the same subcarrier spacing; the UE supporting concurrent reception of signals and/or channels on different subcarrier spacings.

Scheduling availabilities/restrictions (BFD-RS–same subcarrier spacing)

In a first embodiment, the network is bound by restrictions on scheduling availabilities that apply due to the UE performing signal processing tasks related to beam management functions (such as beam failure detection). The first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). When the UE is performing beam failure detection, the network applies scheduling restrictions due to the UE not expecting to receive a second reference signal on the symbols where the BFD-RS to be measured for beam failure detection is mapped.

In another embodiment, the network is bound by restrictions on scheduling availabilities that apply due to the UE performing signal processing tasks related to beam management functions (such as beam failure detection). The first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). When the UE is performing beam failure detection and the Beam Failure Detection timer has been configured and is running, the network applies scheduling restrictions due to the UE not expecting to receive a second reference signal on the symbols where the BFD-RS to be measured for beam failure detection is mapped.

In another embodiment, the network is bound by restrictions on scheduling availabilities that apply due to the UE performing signal processing tasks related to beam management functions (such as beam failure detection). The first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). When the UE is performing beam failure detection and the UE receives n beam failures indications from the lower layers, the network applies scheduling restrictions due to the UE not expecting to receive a second reference signal on the symbols where the BFD-RS to be measured for beam failure detection is mapped. n is a number lower than the maximum number of beam failure indications and may be configured via higher-layer signaling (e.g. RRC, MAC-CE).

In another embodiment, the network is bound by restrictions on scheduling availabilities that apply due to the UE performing signal processing tasks related to beam management functions (such as beam failure detection). The first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). When the UE is performing beam failure detection and the first and second reference signals are not QCL Type D, the network applies scheduling restrictions due to the UE not expecting to receive a second reference signal on the symbols where the BFD-RS to be measured for beam failure detection is mapped.

In another embodiment, if the first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS) and the two reference signals are transmitted on FR1, the network is not bound by any restrictions on scheduling availabilities due to the UE performing signal processing tasks related to beam management functions.

In another embodiment, if the first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS) and the UE supports receiving a first reference signal and a second reference signal concurrently transmitted on FR2, the network is not bound by any restrictions on scheduling availabilities due to the UE performing signal processing tasks related to beam management functions.

The aforementioned embodiments are applicable to Frequency Range 1 (FR1) and to Frequency Range 2 (FR2). The aforementioned embodiments are applicable to serving cells that are Primary Cells (PCell), Primary Secondary Cells (PSCell), Secondary Cells (SCell) and neighboring cells. The applicability of the aforementioned embodiments relies on the capabilities supported by the UE, such as (but not limited to): the UE supporting concurrent reception of signals in FR1; the UE supporting concurrent reception of signals in FR2; the UE supporting concurrent reception of signals on the same subcarrier spacing; the UE supporting concurrent reception of signals on different subcarrier spacing.

Scheduling availabilities/restrictions (BFD-RS–different subcarrier spacing)

In a first embodiment, the network is bound by restrictions on scheduling availabilities that apply due to the UE performing signal processing tasks related to beam management functions (such as beam failure detection). The first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS). The first reference signal and the second reference signal have different subcarrier spacings and are transmitted in Frequency Range 2 (FR2). The UE does not support concurrently receiving the first reference signal over a first subcarrier spacing and the second reference signal over a second subcarrier spacing. When the UE is performing beam failure detection, the network applies scheduling restrictions due to the UE not expecting to receive a second reference signal on the symbols where the BFD-RS to be measured for beam failure detection is mapped.

In another embodiment, the network is bound by restrictions on scheduling availabilities that apply due to the UE performing signal processing tasks related to beam management functions (such as beam failure detection). The first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). The UE does not support concurrently receiving the first reference signal over a first subcarrier spacing and the second reference signal over a second subcarrier spacing. When the UE is performing beam failure detection and the Beam Failure Detection timer has been configured and is running, the network applies scheduling restrictions due to the UE not expecting to receive a second reference signal on the symbols where the BFD-RS to be measured for beam failure detection is mapped.

In another embodiment, the network is bound by restrictions on scheduling availabilities that apply due to the UE performing signal processing tasks related to beam management functions (such as beam failure detection). The first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). The UE does not support concurrently receiving the first reference signal over a first subcarrier spacing and the second reference signal over a second subcarrier spacing. When the UE is performing beam failure detection and the UE receives n beam failures indications from the lower layers, the network applies scheduling restrictions due to the UE not expecting to receive a second reference signal on the symbols where the BFD-RS to be measured for beam failure detection is mapped. n is a number lower than the maximum number of beam failure indications and may be configured via higher-layer signaling (e.g. RRC, MAC-CE).

In another embodiment, if the first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS) and the two reference signals are transmitted on FR1, the network is not bound by any restrictions on scheduling availabilities due to the UE performing signal processing tasks related to beam management functions.

In another embodiment, if the first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS) and the UE supports receiving a first reference signal and a second reference signal concurrently transmitted on FR2, the network is not bound by any restrictions on scheduling availabilities due to the UE performing signal processing tasks related to beam failure detection functions.

The aforementioned embodiments are applicable to Frequency Range 1 (FR1) and to Frequency Range 2 (FR2). The aforementioned embodiments are applicable to serving cells that are Primary Cells (PCell), Primary Secondary Cells (PSCell), Secondary Cells (SCell) and neighboring cells. The applicability of the aforementioned embodiments relies on the capabilities supported by the UE, such as (but not limited to): the UE supporting concurrent reception of signals in FR1; the UE supporting concurrent reception of signals in FR2; the UE supporting concurrent reception of signals on the same subcarrier spacing; the UE supporting concurrent reception of signals on different subcarrier spacing.

Scheduling availabilities/restrictions (BFR-RS–same subcarrier spacing)

In a first embodiment, the network is bound by restrictions on scheduling availabilities that apply due to the UE performing signal processing tasks related to beam management functions (such as beam failure recovery). The first reference signal is a BFR-RS and the second reference signal is some other reference signal (e.g. RLM-RS, BFD-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). When the UE is performing beam failure recovery, the network applies scheduling restrictions due to the UE not expecting to receive a second reference signal on the symbols where the BFR-RS to be measured for beam failure recovery is mapped.

In another embodiment, the network is bound by restrictions on scheduling availabilities that apply due to the UE performing signal processing tasks related to beam management functions (such as beam failure recovery). The first reference signal is a BFR-RS and the second reference signal is some other reference signal (e.g. RLM-RS, BFD-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). When the UE is performing beam failure recovery and the Beam Failure Recovery timer has been configured and is running, the network applies scheduling restrictions due to the UE not expecting to receive a second reference signal on the symbols where the BFR-RS to be measured for beam failure recovery is mapped.

In another embodiment, the network is bound by restrictions on scheduling availabilities that apply due to the UE performing signal processing tasks related to beam management functions (such as beam failure recovery). The first reference signal is a BFR-RS and the second reference signal is some other reference signal (e.g. RLM-RS, BFD-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). When the UE is performing beam failure recovery and the Beam Failure Recovery timer has been configured and is running and the UE is waiting to receive the Random Access Response message, the network applies scheduling restrictions due to the UE not expecting to receive a second reference signal on the symbols where the BFR-RS to be measured for beam failure recovery is mapped.

In another embodiment, the network is bound by restrictions on scheduling availabilities that apply due to the UE performing signal processing tasks related to beam management functions (such as beam failure recovery). The first reference signal is a BFR-RS and the second reference signal is some other reference signal (e.g. RLM-RS, BFD-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). When the UE is performing beam failure recovery and the Beam Failure Recovery timer has been configured and is running and the UE has transmitted the Random Access Preamble, the network applies scheduling restrictions due to the UE not expecting to receive a second reference signal on the symbols where the BFR-RS to be measured for beam failure recovery is mapped.

In another embodiment, the network is bound by restrictions on scheduling availabilities that apply due to the UE performing signal processing tasks related to beam management functions (such as beam failure recovery). The first reference signal is a BFR-RS and the second reference signal is some other reference signal (e.g. RLM-RS, BFD-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). When the UE is performing beam failure recovery and the first and second reference signals are not QCL Type D, the network applies scheduling restrictions due to the UE not expecting to receive a second reference signal on the symbols where the BFR-RS to be measured for beam failure recovery is mapped.

In another embodiment, if the first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS) and the two reference signals are transmitted on FR1, the network is not bound by any restrictions on scheduling availabilities due to the UE performing signal processing tasks related to beam management functions.

In another embodiment, if the first reference signal is a BFR-RS and the second reference signal is some other reference signal (e.g. RLM-RS, BFD-RS, SSB for L3 mobility, CSI-RS for L3 mobility, PDCCH DMRS, PDSCH DMRS) and the UE supports receiving a first reference signal and a second reference signal concurrently transmitted on FR2, the network is not bound by any restrictions on scheduling availabilities due to the UE performing signal processing tasks related to beam management functions.

The aforementioned embodiments are applicable to Frequency Range 1 (FR1) and to Frequency Range 2 (FR2). The aforementioned embodiments are applicable to serving cells that are Primary Cells (PCell), Primary Secondary Cells (PSCell), Secondary Cells (SCell) and neighboring cells. The applicability of the aforementioned embodiments relies on the capabilities supported by the UE, such as (but not limited to): the UE supporting concurrent reception of signals in FR1; the UE supporting concurrent reception of signals in FR2; the UE supporting concurrent reception of signals on the same subcarrier spacing; the UE supporting concurrent reception of signals on different subcarrier spacing.

Scheduling availabilities/restrictions (BFR-RS–different subcarrier spacing)

In a first embodiment, the network is bound by restrictions on scheduling availabilities that apply due to the UE performing signal processing tasks related to beam management functions (such as beam failure recovery). The first reference signal is a BFR-RS and the second reference signal is some other reference signal (e.g. RLM-RS, BFD-RS, SSB for L3 mobility, CSI-RS for L3 mobility, PDCCH DMRS, PDSCH DMRS). The first reference signal and the second reference signal have different subcarrier spacings and are transmitted in Frequency Range 2 (FR2). The UE does not support concurrently receiving the first reference signal over a first subcarrier spacing and the second reference signal over a second subcarrier spacing. When the UE is performing beam failure recovery, the network applies scheduling restrictions due to the UE not expecting to receive a second reference signal on the symbols where the BFR-RS to be measured for beam failure recovery is mapped.

In another embodiment, the network is bound by restrictions on scheduling availabilities that apply due to the UE performing signal processing tasks related to beam management functions (such as beam failure detection). The first reference signal is a BFD-RS and the second reference signal is some other reference signal (e.g. RLM-RS, BFR-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). The UE does not support concurrently receiving the first reference signal over a first subcarrier spacing and the second reference signal over a second subcarrier spacing. When the UE is performing beam failure recovery and the Beam Failure Recovery timer has been configured and is running, the network applies scheduling restrictions due to the UE not expecting to receive a second reference signal on the symbols where the BFR-RS to be measured for beam failure recovery is mapped.

In another embodiment, the network is bound by restrictions on scheduling availabilities that apply due to the UE performing signal processing tasks related to beam management functions (such as beam failure recovery). The first reference signal is a BFR-RS and the second reference signal is some other reference signal (e.g. RLM-RS, BFD-RS, SSB for L3 mobility, CSI-RS for L3 mobility, PDCCH DMRS, PDSCH DMRS). The first reference signal and the second reference signal have the same subcarrier spacing and are transmitted in Frequency Range 2 (FR2). The UE does not support concurrently receiving the first reference signal over a first subcarrier spacing and the second reference signal over a second subcarrier spacing. When the UE is performing beam failure recovery and the Beam Failure Recovery timer has been configured and is running and the UE is waiting to receive the Random Access Response message, the network applies scheduling restrictions due to the UE not expecting to receive a second reference signal on the symbols where the BFR-RS to be measured for beam failure recovery is mapped.

In another embodiment, if the first reference signal is a BFR-RS and the second reference signal is some other reference signal (e.g. RLM-RS, BFD-RS, SSB for L3 mobility, CSI-RS for L3 mobility, PDCCH DMRS, PDSCH DMRS) and the two reference signals are transmitted on FR1, the network is not bound by any restrictions on scheduling availabilities due to the UE performing signal processing tasks related to beam management functions.

In another embodiment, if the first reference signal is a BFR-RS and the second reference signal is some other reference signal (e.g. RLM-RS, BFD-RS, SSB for L3 mobility, CSI-RS for L3 mobility, PDCCH DMRS, PDSCH DMRS) and the UE supports receiving a first reference signal and a second reference signal concurrently transmitted on FR2, the network is not bound by any restrictions on scheduling availabilities due to the UE performing signal processing tasks related to beam failure recovery functions.

The aforementioned embodiments are applicable to Frequency Range 1 (FR1) and to Frequency Range 2 (FR2). The aforementioned embodiments are applicable to serving cells that are Primary Cells (PCell), Primary Secondary Cells (PSCell), Secondary Cells (SCell) and neighboring cells. The applicability of the aforementioned embodiments relies on the capabilities supported by the UE, such as (but not limited to): the UE supporting concurrent reception of signals in FR1; the UE supporting concurrent reception of signals in FR2; the UE supporting concurrent reception of signals on the same subcarrier spacing; the UE supporting concurrent reception of signals on different subcarrier spacing.

Scheduling availabilities/restrictions (RRM-RS–same subcarrier spacing)

In a first embodiment, the network is bound by restrictions on scheduling availabilities that apply due to the UE performing signal processing tasks related to L3 mobility. The first reference signal is an RS for L3 mobility (e.g. SSB or CSI-RS) and the second reference signal is some other reference signal (e.g. RLM-RS, BFD-RS, BFR-RS, PDCCH DMRS, PDSCH DMRS). The first reference signal and the second reference signal have the same subcarrier spacing and are transmitted in Frequency Range 2 (FR2). When the UE is performing measurements for L3 mobility, the network applies scheduling restrictions due to the UE not expecting to receive a second reference signal on the symbols where the RRM-RS to be measured for L3 mobility is mapped.

In another embodiment, the network is bound by restrictions on scheduling availabilities that apply due to the UE performing signal processing tasks related to L3 mobility. The first reference signal is an RS for L3 mobility (e.g. SSB or CSI-RS) and the second reference signal is some other reference signal (e.g. RLM-RS, BFD-RS, BFR-RS, PDCCH DMRS, PDSCH DMRS). The first reference signal and the second reference signal have the same subcarrier spacing and are transmitted in Frequency Range 2 (FR2). When the UE is performing measurements for L3 mobility, the network applies scheduling restrictions due to the UE not expecting to receive a second reference signal on the symbols where the RRM-RS to be measured for L3 mobility is mapped.

In another embodiment, the network is bound by restrictions on scheduling availabilities that apply due to the UE performing signal processing tasks related to L3 mobility. The first reference signal is an RS for L3 mobility (e.g. SSB or CSI-RS) and the second reference signal is some other reference signal (e.g. RLM-RS, BFD-RS, BFR-RS, PDCCH DMRS, PDSCH DMRS). The first reference signal and the second reference signal have the same subcarrier spacing and are transmitted in Frequency Range 2 (FR2). When the UE is performing measurements on SSBs for L3 mobility and the SSBs are located within an SSB measurement timing configuration (SMTC) window, the network applies scheduling restrictions due to the UE not expecting to receive a second reference signal on symbols within a threshold distance of where the SSB to be measured for L3 mobility is mapped. The threshold distance may be given in any time unit (e.g. OFDM symbols, group of OFDM symbols, slots).

In another embodiment, if the first reference signal is an RS for L3 mobility and the second reference signal is some other reference signal (e.g. RLM-RS, BFD-RS, BFR-RS, PDCCH DMRS, PDSCH DMRS) and the two reference signals are transmitted on FR1, the network is not bound by any restrictions on scheduling availabilities due to the UE performing signal processing tasks related to L3 mobility functions.

In another embodiment, if the first reference signal is an RS for L3 mobility and the second reference signal is some other reference signal (e.g. RLM-RS, BFD-RS, BFR-RS, PDCCH DMRS, PDSCH DMRS) and the UE supports receiving a first reference signal and a second reference signal concurrently transmitted on FR2, the network is not bound by any restrictions on scheduling availabilities due to the UE performing signal processing tasks related to L3 mobility functions.

The aforementioned embodiments are applicable to Frequency Range 1 (FR1) and to Frequency Range 2 (FR2). The aforementioned embodiments are applicable to serving cells that are Primary Cells (PCell), Primary Secondary Cells (PSCell), Secondary Cells (SCell) and neighboring cells. The aforementioned embodiments are applicable to intra-frequency measurements or inter-frequency measurements. The applicability of the aforementioned embodiments relies on the capabilities supported by the UE, such as (but not limited to): the UE supporting concurrent reception of signals in FR1; the UE supporting concurrent reception of signals in FR2; the UE supporting concurrent reception of signals on the same subcarrier spacing; the UE supporting concurrent reception of signals on different subcarrier spacing.

Scheduling availabilities/restrictions (RRM-RS–different subcarrier spacing)

In a first embodiment, the network is bound by restrictions on scheduling availabilities that apply due to the UE performing signal processing tasks related to L3 mobility. The first reference signal is an RS for L3 mobility (e.g. SSB or CSI-RS) and the second reference signal is some other reference signal (e.g. RLM-RS, BFD-RS, BFR-RS, PDCCH DMRS, PDSCH DMRS). The first reference signal and the second reference signal have different subcarrier spacings and are transmitted in Frequency Range 2 (FR2). The UE does not support concurrently receiving the first reference signal over a first subcarrier spacing and the second reference signal over a second subcarrier spacing. When the UE is performing measurements for L3 mobility, the network applies scheduling restrictions due to the UE not expecting to receive a second reference signal on the symbols where the RRM-RS to be measured for L3 mobility is mapped.

In another embodiment, the network is bound by restrictions on scheduling availabilities that apply due to the UE performing signal processing tasks related to L3 mobility. The first reference signal is an RS for L3 mobility (e.g. SSB or CSI-RS) and the second reference signal is some other reference signal (e.g. RLM-RS, BFD-RS, BFR-RS, PDCCH DMRS, PDSCH DMRS). The first reference signal and the second reference signal have different subcarrier spacings and are transmitted in Frequency Range 2 (FR2). The UE does not support concurrently receiving the first reference signal over a first subcarrier spacing and the second reference signal over a second subcarrier spacing. When the UE is performing measurements for L3 mobility, the network applies scheduling restrictions due to the UE not expecting to receive a second reference signal on the symbols where the RRM-RS to be measured for L3 mobility is mapped.

In another embodiment, the network is bound by restrictions on scheduling availabilities that apply due to the UE performing signal processing tasks related to L3 mobility. The first reference signal is an RS for L3 mobility (e.g. SSB or CSI-RS) and the second reference signal is some other reference signal (e.g. RLM-RS, BFD-RS, BFR-RS, PDCCH DMRS, PDSCH DMRS). The first reference signal and the second reference signal have different subcarrier spacings and are transmitted in Frequency Range 2 (FR2). The UE does not support concurrently receiving the first reference signal over a first subcarrier spacing and the second reference signal over a second subcarrier spacing. When the UE is performing measurements on SSBs for L3 mobility and the SSBs are located within an SSB measurement timing configuration (SMTC) window, the network applies scheduling restrictions due to the UE not expecting to receive a second reference signal on symbols within a threshold distance of where the SSB to be measured for L3 mobility is mapped. The threshold distance may be given in any time unit (e.g. OFDM symbols, group of OFDM symbols, slots).

In another embodiment, if the first reference signal is an RS for L3 mobility and the second reference signal is some other reference signal (e.g. RLM-RS, BFD-RS, BFR-RS, PDCCH DMRS, PDSCH DMRS) and the UE supports receiving a first reference signal and a second reference signal concurrently transmitted on FR2, the network is not bound by any restrictions on scheduling availabilities due to the UE performing signal processing tasks related to L3 mobility functions.

The aforementioned embodiments are applicable to Frequency Range 1 (FR1) and to Frequency Range 2 (FR2). The aforementioned embodiments are applicable to serving cells that are Primary Cells (PCell), Primary Secondary Cells (PSCell), Secondary Cells (SCell) and neighboring cells. The applicability of the aforementioned embodiments relies on the capabilities supported by the UE, such as (but not limited to): the UE supporting concurrent reception of signals in FR1; the UE supporting concurrent reception of signals in FR2; the UE supporting concurrent reception of signals on the same subcarrier spacing; the UE supporting concurrent reception of signals on different subcarrier spacing.

Combinations of one or more of the above embodiments can be used to specify the UE behavior for any kind of scenario of reference signal multiplexing.

All of the embodiments above outlining restrictions on scheduling availabilities are applicable if the first reference signals and the second reference signals are within a threshold distance in the time domain of the symbol where the first reference signal to be measured is mapped.

What is claimed is:

1. A method, comprising:
  receiving, by a user equipment (UE), information from a network device, the information indicating that a first reference signal and a second reference signal are to be transmitted over a same Orthogonal Frequency Division Multiplexing (OFDM) symbol in Frequency Range 2 (FR2); and
  measuring, by the UE, one but not both of the first reference signal and the second reference signal when the first reference signal and the second reference signal are not Quasi Co-located (QCL) with association of Type D.

2. The method of claim 1, wherein the first reference signal is a reference signal for Beam Failure Detection (BFD), and wherein the UE measures one but not both of the first reference signal and the second reference signal when the UE is measuring the reference signal for BFD.

3. The method of claim 2, wherein the second reference signal is a reference signal for Radio Link Monitoring (RLM) or a reference signal for Beam Failure Recovery (BFR), or another reference signal for BFD.

4. The method of claim 2, wherein the UE has received n beam failure indications from a lower layer of the UE, where n is less than a third threshold value.

5. The method of claim 1, wherein the first reference signal is a reference signal for BFR, and wherein the UE measures one but not both of the first reference signal and the second reference signal when the UE is measuring the reference signal for BFR.

6. The method of claim 5, wherein the second reference signal is a reference signal for RLM, a reference signal for BFD, or another reference signal for BFR.

7. The method of claim 1, wherein the first reference signal is a reference signal for RLM, and wherein the UE measures one but not both of the first reference signal and the second reference signal when the UE is measuring the reference signal for RLM.

8. The method of claim 7, wherein the second reference signal is a reference signal for BFD, a reference signal for BFR, or another reference signal for RLM.

9. The method of claim 7, wherein the UE has received n consecutive out-of-sync indications from a lower layer of the UE, where n is less than a first threshold value, or wherein the UE has received n' consecutive in-sync indications from the lower layer of the UE, where n' is less than a second threshold value.

10. The method of claim 1, wherein the first reference signal and the second reference signal are received using a same subcarrier spacing.

11. The method of claim 1, wherein the first reference signal and the second reference signal are received using different OFDM numerologies.

12. A method, comprising:
  transmitting, by a network device, information to a user equipment (UE), the information indicating that a first reference signal and a second reference signal are to be transmitted over a same Orthogonal Frequency Division Multiplexing (OFDM) symbol in Frequency Range 2 (FR2); and
  transmitting, by the network device to the UE, one but not both of the first reference signal and the second reference signal when the first reference signal and the second reference signal are not Quasi Co-located (QCL) with association of Type D.

13. The method of claim 12, wherein the first reference signal is a reference signal for Radio Link Monitoring (RLM), a reference signal for Beam Failure Detection (BFD), or a reference signal for Beam Failure Recovery (BFR), and wherein the second reference signal is another reference signal for RLM, another reference signal for BFD, or another reference signal for BFR.

14. A user equipment (UE) comprising:
  a non-transitory memory storage comprising instructions; and
  one or more processors in communication with the non-transitory memory storage, wherein the one or more processors execute the instructions to cause the UE to:
    receive information from a network device, the information indicating that a first reference signal and a second reference signal are to be transmitted over a same Orthogonal Frequency Division Multiplexing (OFDM) symbol in Frequency Range 2 (FR2); and measure one but not both of the first reference signal and the second reference signal when the first reference signal and the second reference signal are not Quasi Co-located (QCL) with association of Type D.

15. The UE of claim 14, wherein the first reference signal is a reference signal for Beam Failure Detection (BFD), and wherein the UE measures one but not both of the first reference signal and the second reference signal when the UE is measuring the reference signal for BFD.

16. The UE of claim 14, wherein the first reference signal is a reference signal for Beam Failure Recovery (BFR), and wherein the UE measures one but not both of the first reference signal and the second reference signal when the UE is measuring the reference signal for BFD.

17. The UE of claim 14, wherein the first reference signal is a reference signal for Radio Link Monitoring (RLM), and wherein the UE measures one but not both of the first reference signal and the second reference signal when the UE is measuring the reference signal for RLM.

18. The UE of claim 14, wherein the first reference signal is a reference signal for RLM, a reference signal for BFD, or a reference signal for BFR, and wherein the second reference signal is another reference signal for RLM, another reference signal for BFD, or another reference signal for BFR.

19. A network device comprising:
a non-transitory memory storage comprising instructions; and
one or more processors in communication with the non-transitory memory storage, wherein the one or more processors execute the instructions to cause the network device to:
  transmit information to a user equipment (UE), the information indicating that a first reference signal and a second reference signal are to be transmitted over a same Orthogonal Frequency Division Multiplexing (OFDM) symbol in Frequency Range 2 (FR2); and
  transmit one but not both of the first reference signal and the second reference signal to the UE when the first reference signal and the second reference signal are not Quasi Co-located (QCL) with association of Type D.

20. The network device of claim 19, wherein the first reference signal is a reference signal for Radio Link Monitoring (RLM), a reference signal for Beam Failure Detection (BFD), or a reference signal for Beam Failure Recovery (BFR), and wherein the second reference signal is another reference signal for RLM, another reference signal for BFD, or another reference signal for BFR.

* * * * *